US012563323B2

(12) United States Patent (10) Patent No.: US 12,563,323 B2
Nakagawa et al. (45) Date of Patent: Feb. 24, 2026

(54) WAVELENGTH CROSS CONNECT DEVICE, AND WAVELENGTH CROSS CONNECT METHOD

(71) Applicant: NTT, Inc., Tokyo (JP)

(72) Inventors: Masahiro Nakagawa, Musashino (JP);
Hiroki Kawahara, Musashino (JP);
Takeshi Seki, Musashino (JP)

(73) Assignee: NTT, Inc., Tokyo (JP)

( * ) Notice: Subject to any disclaimer, the term of this patent is extended or adjusted under 35 U.S.C. 154(b) by 288 days.

(21) Appl. No.: 18/567,525

(22) PCT Filed: Jun. 7, 2021

(86) PCT No.: PCT/JP2021/021585
§ 371 (c)(1),
(2) Date: Dec. 6, 2023

(87) PCT Pub. No.: WO2022/259319
PCT Pub. Date: Dec. 15, 2022

(65) Prior Publication Data
US 2024/0422456 A1 Dec. 19, 2024

(51) Int. Cl.
*H04Q 11/00* (2006.01)
(52) U.S. Cl.
CPC .. *H04Q 11/0005* (2013.01); *H04Q 2011/0011* (2013.01); *H04Q 2011/0016* (2013.01); *H04Q 2011/006* (2013.01); *H04Q 2213/076* (2013.01)
(58) Field of Classification Search
None
See application file for complete search history.

(56) References Cited

U.S. PATENT DOCUMENTS 8,909,043 B2 * 12/2014 Patel .................. H04J 14/0217
398/58
9,800,959 B2 * 10/2017 Zhang ................ H04Q 11/0005
(Continued)

FOREIGN PATENT DOCUMENTS

JP 2020-137042 8/2020

OTHER PUBLICATIONS

Kawahara et al., Experimental Demonstration of Wavelength-Selective Band/Direction-Switchable Multi-Band OXC Using an Inter-Band All-Optical Wavelength Coverter, IEEE, 2020 (Year: 2020).*
(Continued)

*Primary Examiner* — Jai M Lee
(74) *Attorney, Agent, or Firm* — Fish & Richardson P.C.

(57) ABSTRACT
A wavelength cross connect device includes: a wavelength band switching unit configured to receive wavelength multiplexed signal beams each having been transmitted in multiple bands in optical transmission lines each including one or more optical fibers, the wavelength multiplexed signal beams each including multiplexed optical signals of distinct wavelength bands, perform wavelength band conversion on each of the wavelength multiplexed signal beams so as to convert the wavelength bands of the optical signals multiplexed in the wavelength multiplexed signal beam, and output the converted wavelength multiplexed signal beams; and a WXC unit including input-side WSSes that respectively split and output the wavelength multiplexed signal beams output from the wavelength band switching unit, and output-side WSSes mesh-connected to the input-side WSSes. The WXC unit inputs the split wavelength multiplexed signal beams to the output-side WSSes while performing rerouting and outputs the rerouted wavelength multiplexed signal beams to output transmission lines.

8 Claims, 14 Drawing Sheets

(56)     References Cited

U.S. PATENT DOCUMENTS

| | | | | |
|---|---|---|---|---|
| 10,855,393 B2 * | 12/2020 | Yuki | .................... | H04J 14/0256 |
| 11,979,226 B2 * | 5/2024 | Kawahara | .......... | H04Q 11/0005 |
| 12,244,346 B2 * | 3/2025 | Kawahara | ........... | H04B 10/291 |
| 12,316,383 B2 * | 5/2025 | Kawahara | ........... | H04J 14/0257 |
| 2002/0015551 A1 * | 2/2002 | Tsuyama | ............. | H04J 14/0209 |
| | | | | 398/4 |
| 2004/0165818 A1 * | 8/2004 | Oikawa | .............. | H04Q 11/0005 |
| | | | | 385/24 |
| 2005/0089027 A1 * | 4/2005 | Colton | ............... | H04Q 11/0005 |
| | | | | 370/380 |
| 2008/0181605 A1 * | 7/2008 | Palacharla | ......... | H04Q 11/0005 |
| | | | | 398/48 |
| 2020/0274633 A1 | 8/2020 | Yuki | | |
| 2024/0373152 A1 * | 11/2024 | Kawahara | .............. | H04B 10/27 |

OTHER PUBLICATIONS

Napoli et al., "Perspectives of multi-band optical communication systems," The 23rd OptoElectronics and Communications Conference (OECC 2018) Technical Digest, Jul. 2-6, 2018, Jeju, Korea, 2 pages.

* cited by examiner

FIG. 2

| THREE-SEGMENT PATH | FIRST SEGMENT | SECOND SEGMENT | THIRD SEGMENT |
|---|---|---|---|
| PATH 1 | S | C | L |
| PATH 2 | C | L | S |
| PATH 3 | L | S | C |

FIG. 11

WAVELENGTH CROSS CONNECT DEVICE, AND WAVELENGTH CROSS CONNECT METHOD

CROSS-REFERENCE TO RELATED APPLICATIONS

This is a National Stage Application of PCT Application No. PCT/JP2021/021585, filed on Jun. 7, 2021. The disclosure of the prior application is considered part of the disclosure of this application, and is incorporated in its entirety into this application.

TECHNICAL FIELD

The present invention relates to a wavelength cross connect device and a wavelength cross connect method to be used in multi-band transmission for transmitting wavelength multiplexed signal beams in each of which optical signals in distinct wavelength bands are multiplexed through optical fibers.

BACKGROUND

A wavelength cross connect device used in a multi-band transmission system is an optical node that connects desired routes in an optical network in optical transmission lines that are formed with one or a plurality of optical fibers or multicore fibers that transmit wavelength multiplexed signal beams in which optical signals in distinct wavelength bands are multiplexed. In this wavelength cross connect device, a wavelength multiplexed signal beam transmitted from a route on the input side is output to desired routes on the output side via a plurality of wavelength selective switches (WSSes).

Conventional wavelength cross connect devices first demultiplex, in each of input-side M routes, optical signals of respective wavelength bands of a wavelength multiplexed signal beam transmitted in multiple bands. For example, optical signals of respective wavelength bands of S, C, and L bands multiplexed in the wavelength multiplexed signal beam are demultiplexed.

Here, the respective wavelength bands are S band of 1460 nm to 1530 nm, C band of 1530 nm to 1565 nm, and L band of 1565 nm to 1625 nm, in ascending order from the short-wavelength side. The S-, C-, and L-band optical signals are respectively allocated to S, C, and L bands of the optical fibers as the routes at the time of transmission.

The respective demultiplexed optical signals of S, C, and L bands (the respective wavelength bands) are input to wavelength cross connect (WXC) units respectively provided for the wavelength bands. In each WXC, a WSS provided for the corresponding wavelength band on the input side of the WXC performs processing such as attenuation amount adjustment on the optical signal of the corresponding wavelength band. The resultant optical signals are input to output-side WSSes provided for respective wavelength bands and mesh-connected to the input-side WSSes. The input S-, C-, and L-band optical signals are combined by the WSSes on the output side, and the wavelength multiplexed signal beams obtained by this combining are transmitted in multiple bands toward M routes on the output side.

Non-Patent Literature 1 discloses a conventional technique relating to this kind of wavelength cross connect device.

CITATION LIST

Non-Patent Literature

Non-Patent Literature 1: A. Napoli, et al., "Perspectives of multi-band optical communication systems", Proc. OECC 2018, paper 5B3-1, July 2018.

SUMMARY OF THE INVENTION

Technical Problem

In the conventional wavelength cross connect device described above, however, there are differences in the optical characteristics due to the differences among the wavelength bands in the configurations of the S-, C-, and L-band WXCs. As a result, variations in transmission performance occur among S-, C-, and L-band optical signals. For example, wavelength band dependency appears in the transmission band and the optical loss, which are specification items of a WSS and an optical amplifier, and this wavelength band dependency causes variations in the optical signal transmission performance among S, C, and L bands. The variations lower the efficiency of utilizing each wavelength band in the optical network.

The present invention has been made in view of such circumstances, and aims to reduce differences in transmission performance among optical signals of distinct wavelength bands within an optical network, thereby enhancing the efficiency of utilizing each wavelength band within the optical network.

Solution to Problem

To solve the above problem, the present invention provides a wavelength cross connect device that includes: a wavelength band switching unit configured to split each of wavelength multiplexed signal beams, in each of which optical signals of respective distinct wavelength bands are multiplexed and each of which has been transmitted in multiple bands in a respective one of a plurality of optical transmission lines formed with one or a plurality of optical fibers, into a predetermined number of wavelength multiplexed signal beams, perform wavelength band conversion on each of the split predetermined number of wavelength multiplexed signal beams, and output each of the split predetermined number of wavelength multiplexed signal beams to which the wavelength band conversion has been performed; and a wavelength cross connect (WXC) unit including a plurality of first input-side WSSes configured to split and output respective wavelength multiplexed signal beams output from the wavelength band switching unit and a plurality of first output-side WSSes mesh-connected to the first input-side WSSes, the WXC unit configured to input the wavelength multiplexed signal beams split by the first input-side WSSes to the first output-side WSSes to perform rerouting and then output the rerouted wavelength multiplexed signal beams to output transmission lines.

Advantageous Effects of Invention

The present invention enables the reduction of differences in transmission performance among optical signals of distinct wavelength bands within an optical network, thereby enhancing the efficiency of utilizing each wavelength band within the optical network.

BRIEF DESCRIPTION OF DRAWINGS

FIG. 2 is a block diagram illustrating the configuration of a wavelength band switch processing unit of the wavelength cross connect device according to the embodiment.

FIG. 11 is an explanatory diagram of Example 2 of path setting.

DESCRIPTION OF EMBODIMENTS

Figure 1:
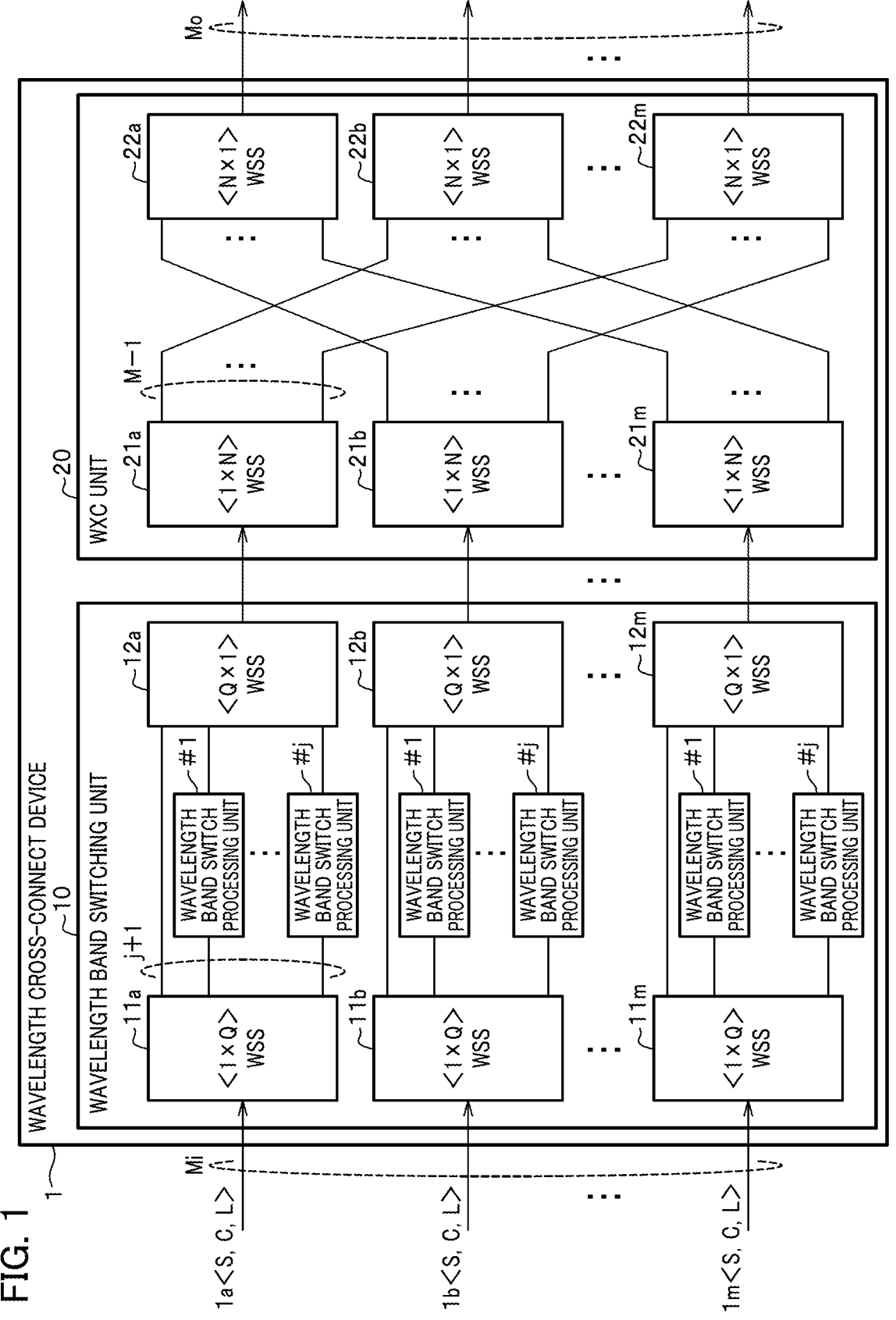
FIG. 1 is a block diagram illustrating the configuration of a wavelength cross connect device that is used in a multi-band transmission system according to an embodiment of the present invention.

Hereinbelow, a description will be given of an embodiment of the present invention with reference to the drawings. Note that, in all the drawings in this specification, components having corresponding functions are denoted by the same reference numerals, and explanation of them will not be repeated as appropriate.

Configuration of Embodiment

FIG. 1 is a block diagram illustrating the configuration of a wavelength cross connect device that is used in a multi-band transmission system according to an embodiment of the present invention.

Wavelength cross connect device 1 illustrated in FIG. 1 includes wavelength band switching unit 10 and WXC unit 20.

Wavelength band switching unit 10 includes: M<1×Q> wavelength selective switches (WSSes) 11a, 11b, . . . , and 11m which are respectively connected to M input routes denoted by reference sign Mi and to which wavelength multiplexed signal beams 1a, 1b, . . . , and 1m transmitted in multiple bands through the input routes respectively are inputted; and M<Q×1> WSSes 12a, 12b, . . . , and 12m on the output side. Further, M sets of j wavelength band switch processing units #1 to #j are provided between input-side <1×Q> WSSes 11a to 11m and output-side <Q×1> WSSes 12a to 12m.

Here, each of the M routes Mi includes one or a plurality of optical fibers. Also, as represented as 1a<S, C, L>, 1b<S, C, L>, and 1m<S, C, L> in FIG. 1, in each of wavelength multiplexed signal beams 1a to 1m transmitted in multiple bands through the input routes respectively, S-, C-, and L-band optical signals are multiplexed. Input-side <1×Q> WSSes 11a to 11m form the second input-side WSSes described in the claims. Output-side <Q×1> WSSes 12a to 12m form the second output-side WSSes described in the claims.

Input-side <1×Q> WSSes 11a to 11m each include one input port and Q output ports. and output-side <Q×1> WSSes 12a to 12m each include Q input ports and one output port. Here, Q=j+1. Also, in this example, the output ports and the input ports are counted as the first port, the second port, . . . in order from the top in the drawing.

The first output port of the Q output ports of <1×Q> WSS 11a, which is related to one input path, and the first input port of the Q input ports of output-side <Q×1> WSS 12a are connected directly to each other. Between the second to Q-th output ports and the second to Q-th input ports, j wavelength band switch processing units #1 to #j (described later) are connected. Such a connection applies between input-side <1×Q> WSSes 11b to 11m, which are related to the other input paths, and output-side <Q×1> WSSes 12b to 12m in the same manner.

As input-side <1×Q> WSSes 11a to 11m have the same functions, the first <1×Q> WSS 11a will now be described as a representative. The first <1×Q> WSS 11a Q-splits wavelength multiplexed signal beam 1a transmitted in multiple bands (wavelength bands of S, C, and L bands), and outputs the Q-split wavelength multiplexed signal beams 1a from the Q output ports. Of the output Q wavelength multiplexed signal beams 1a, the first wavelength multiplexed signal beam 1a is output to the first input port of output-side <Q×1> WSS 12a. The second to Q-th wavelength multiplexed signal beams 1a are subjected to wavelength band conversion or the like by wavelength band switch processing units #1 to #j described later, and are then input to the second to Q-th input ports of <Q×1> WSS 12a. Note that the WSS has a function of performing the Q-splitting by means of outputting each optical signal of the wavelength multiplexed signal beam input from the input port from a desired output port, rather than simple Q-splitting using a coupler or the like.

Output-side <Q×1> WSSes 12a to 12m have the same functions, and have processing functions of sequentially performing selection on the multi-band wavelength multiplexed signal beams input from the Q input ports, and outputting the selected multi-band wavelength multiplexed signal beams from the one output port to <1×N> WSSes 21a to 21m of WXC unit 20.

Configuration of Wavelength Band Switch Processing Unit

Figure 2:
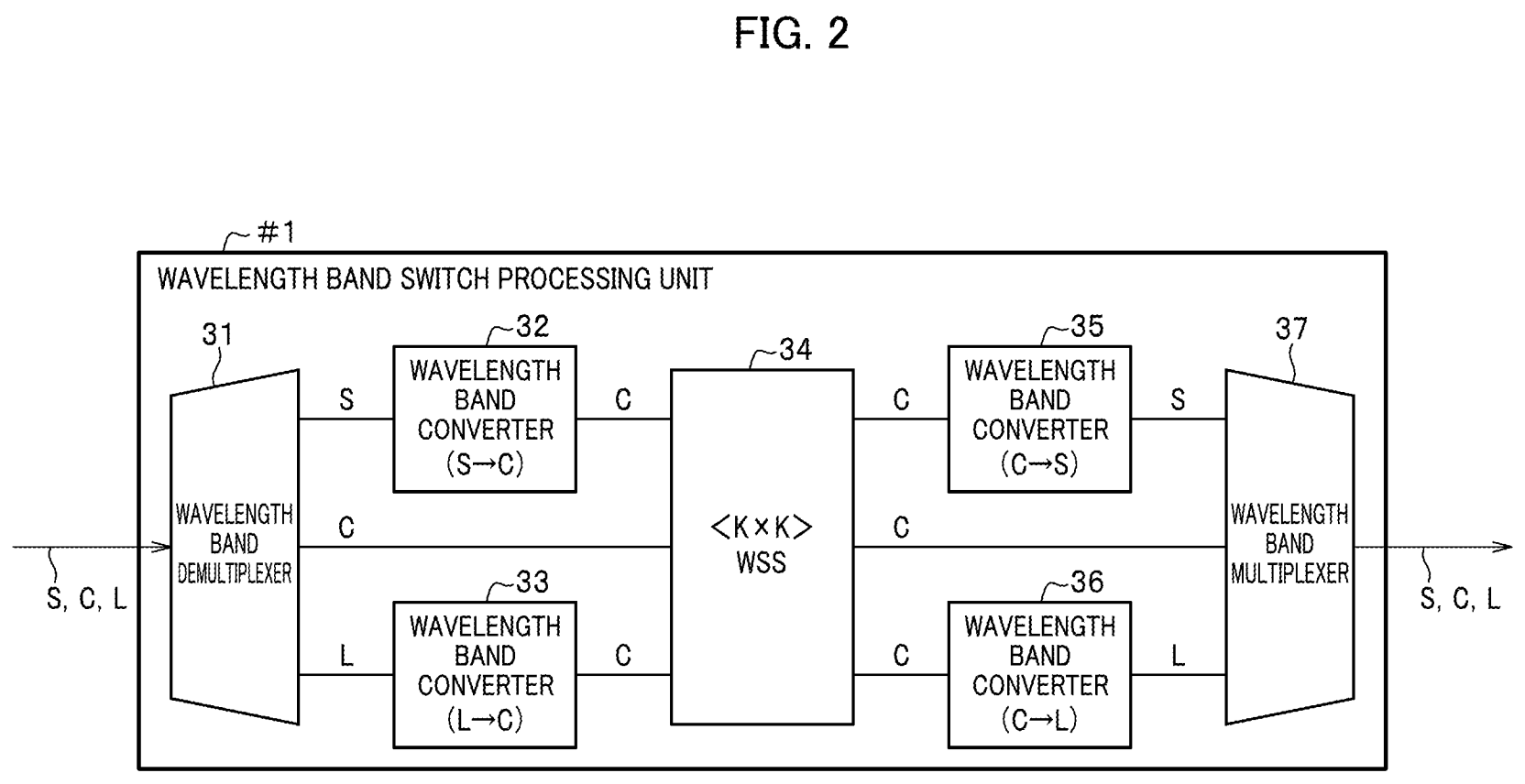

Each of wavelength band switch processing units #1 to #j has the same functions, and, as illustrated in FIG. 2 in which wavelength band switch processing unit #1 is depicted as a representative, includes a wavelength band demultiplexer 31, a plurality of input-side wavelength band converters 32 and 33, a <K×K> WSS 34, a plurality of output-side wavelength band converters 35 and 36, and wavelength band multiplexer 37.

K is the number of wavelength bands, and K=3. because of S, C, and L bands in this example. Note that <K×K> WSS 34 forms the specific WSS described in the claims. Wavelength band converters 32 and 33 on the input side form the input-side converters described in the claims. Wavelength band converters 35 and 36 on the output side form the output-side converters described in the claims.

Wavelength band demultiplexer 31 demultiplexes a wavelength multiplexed signal beam, in which S-. C-, and L-band optical signals have been multiplexed and is input from <1×Q> WSSes 11a (FIG. 1) of wavelength band switching unit 10, and outputs the demultiplexed, S-, C-, and L-band optical signals. Here, C band is the one wavelength band (specific wavelength band) processable by <K×K> WSS 34. <K×K> WSS 34 is configured to be capable of processing only optical signals in the specific wavelength band (C band). Accordingly, the demultiplexed C-band optical signal is input directly to <K×K> WSS 34.

Wavelength band converter 32 on the input side of <K×K> WSS 34 converts the S-band optical signal into a C-band optical signal, and outputs the converted C-band optical signal to <K×K> WSS 34. Wavelength band converter 33 converts the L-band optical signal into the C-band optical signal, and outputs the converted C-band optical signal to <K×K> WSS 34.

Wavelength band converter 35 on the output side converts a C-band optical signal into an S-band optical signal, and outputs the converted S-band optical signal to wavelength band multiplexer 37. Wavelength band converter 36 converts a C-band optical signal into an L-band optical signal, and outputs the converted L-band optical signal to wavelength band multiplexer 37.

<K×K> WSS 34 performs processing for converting the wavelength bands of the optical signals multiplexed in the wavelength multiplexed signal beam 1a, input from optical transmission lines Mi on the input side of wavelength cross connect device 1 (FIG. 1), into different wavelength bands.

<K×K> WSS 34 has the same number of input ports and the same number of output ports as the number (K=3) of the wavelength bands of the optical signals multiplexed in the wavelength multiplexed signal beam. In <K×K> WSS 34, the C-band optical signals input from the K (=3) input ports are output from the K (=3) output ports connected to: wavelength band converters 35 and 36, which perform conversion into a predetermined wavelength band; and wavelength band multiplexer 37.

For example, the C-band optical signal demultiplexed by wavelength band demultiplexer 31 is input to the second input port of <K×K> WSS 34, then input to wavelength band converter 35 from the first output port, and then converted into an S-band optical signal by wavelength band converter 35. This example is conversion processing for converting a C-band optical signal input from the input routes Mi into an S-band optical signal and transmitting the S-band optical signal to optical transmission lines Mo (FIG. 1) on the output side.

Wavelength band multiplexer 37 combines the S-, C-, and L-band optical signals and outputs the resultant optical signal to the second input port of output-side <Q×1> WSS 12a illustrated in FIG. 1.

Next, WXC unit 20 illustrated in FIG. 1 includes M<1× N> WSSes 21a, 21b, . . . , and 21m connected to the output ports of M<Q×1> WSSes 12a to 12m of wavelength band switching unit 10, and M output-side <N×1> WSSes 22a, 22b, . . . , and 22m connected to input-side M<1×N> WSSes 21a to 21m by full-mesh connection (described later). Here, N and M have a magnitude relationship of M>N, and N=M−1. Note that input-side M<1×N>WSSes 21a to 21m form the first input-side WSSes described in the claims. Output-side M<N×1> WSSes 22a to 22m form the first output-side WSSes described in the claims.

The output ports of output-side <N×1> WSSes 22a to 22m are connected to M output routes, denoted by reference sign Mo, and output the wavelength multiplexed signal beams. Note that input-side <1×N> WSSes 21a to 21m may be 1×N optical couplers such as optical fiber couplers.

The full-mesh connection is as follows. That is, in input-side <1×N> WSSes 21a to 21m, the N output ports of the first WSS 21a are connected to the N input ports of the second to M-th output-side WSSes 22b to 22m excluding the first output-side WSS. In this manner, the N output ports of <1×N> WSSes 21a to 21m are connected to the N input ports of <N×1> WSSes 22a to 22m other than the output-side WSS located on the same number route as the input-side WSS. This connection forms paths in which wavelength multiplexed signal beams output from the N output ports of <1×N> WSSes 21a to 21m are rerouted.

Input-side <1×N> WSSes 21a to 21m have the same functions, and each have a function of collectively selecting and switching wavelengths in multiple bands (wavelength bands of S, C, and L bands). Taking the first input-side WSS 21a as a representative, WSS 21a splits wavelength multiplexed signal beam 1a input from one input port, and outputs the split wavelength multiplexed signal beams 1a from the N output ports.

Output-side <N×1> WSSes 22a to 22m have the same functions, and each have a function of collectively selecting and switching wavelengths in multiple bands. Taking the first output-side WSS 22a as a representative, WSS 22a sequentially performs selection on the wavelength multiplexed signal beams input from the N input ports, and outputs the selected wavelength multiplexed signal beam to one output route from the one output port.

Operation of Embodiment

Next, the wavelength cross connect operation performed by wavelength cross connect device 1 according to the embodiment will be described with reference to the flowchart shown in FIG. 3.

Figure 3:
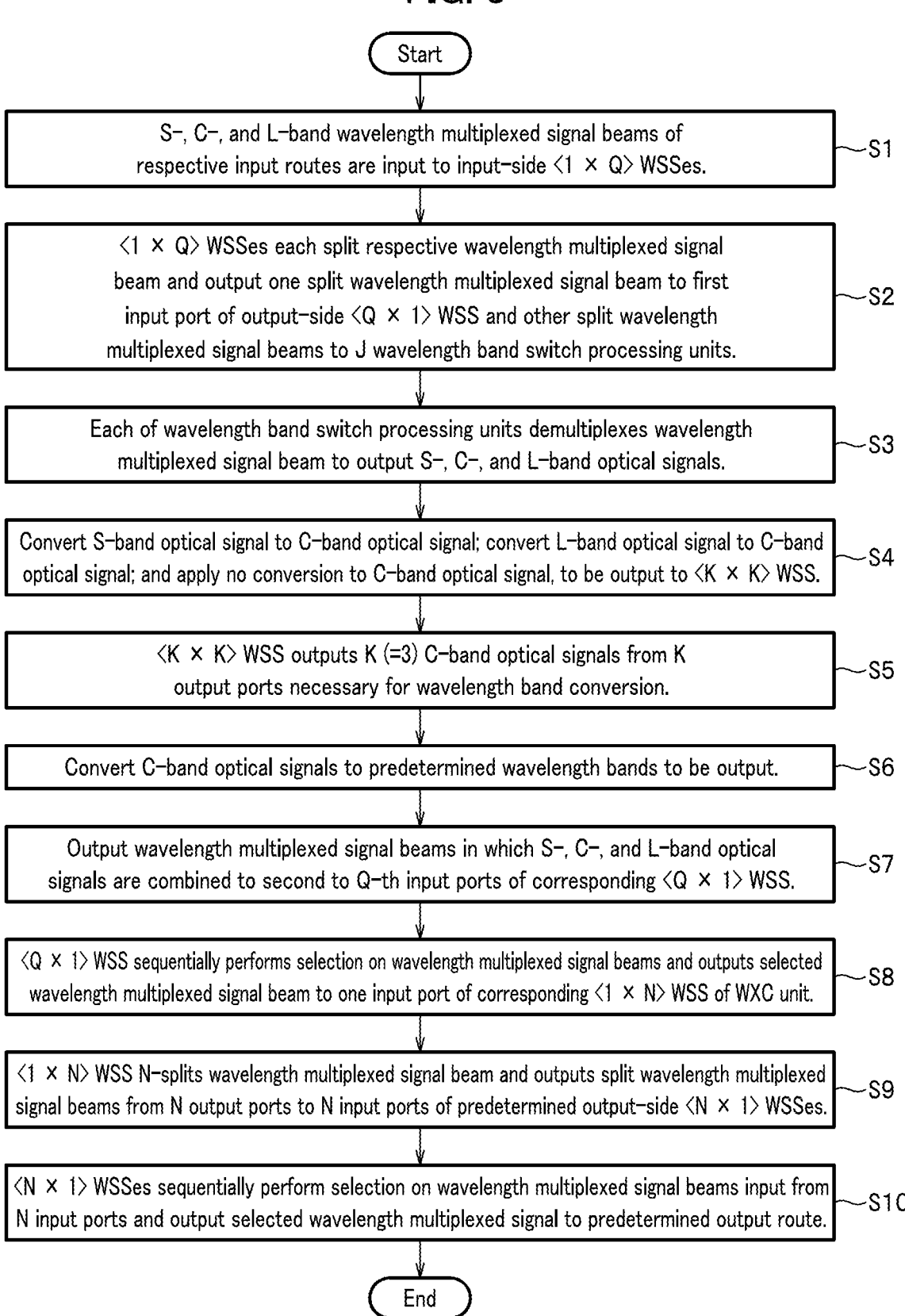
FIG. 3 is a flowchart for explaining a wavelength cross connect operation performed by the wavelength cross connect device according to the embodiment.

In step S1 shown in FIG. 3, wavelength multiplexed signal beams 1a to 1m transmitted in multiple bands in the respective M input routes illustrated in FIG. 1 are respectively input to the one input port of M<1×Q> WSSes 11a to 11m of wavelength band switching unit 10. Note that each of wavelength multiplexed signal beams 1a to 1m includes multiplexed S-, C-, and L-band optical signals.

In step S2, each of <1×Q> WSSes 11a to 11m Q-splits a respective one of wavelength multiplexed signal beams 1a to 1m to be output to the first input port of a respective one of output-side <Q×1> WSSes 12a to 12m directly and to wavelength band switch processing units #1 to #j.

In step S3, each of wavelength band switch processing units #1 to #j demultiplexes the input S-, C-, and L-band wavelength multiplexed signal beam by means of wavelength band demultiplexer 31 illustrated in FIG. 2 and outputs the demultiplexed S-, C-, and L-band optical signals. In this step, the C-band optical signal is input as is to <K×K> WSS 34. The S-band optical signal is output to wavelength band converter 32; and the L-band optical signal is output to wavelength band converter 33.

In step S4, wavelength band converter 32 converts the S-band optical signal into a C-band optical signal, and outputs the converted C-band optical signal to <K×K> WSS 34. Wavelength band converter 33 converts the L-band optical signal into a C-band optical signal, and outputs the converted C-band optical signal to <K×K> WSS 34. The C-band optical signal is output to <K×K> WSS 34 without conversion.

In step S5, <K×K> WSS 34 outputs the C-band optical signals input from the K (=3) input ports from the K output ports necessary for wavelength band conversion. For example, the C-band optical signal input from the second input port of <K×K> WSS 34 is output from the first output port to wavelength band converter 35.

In step S6, wavelength band converter 35 converts the C-band optical signal into an S-band optical signal, and outputs the converted S-band optical signal to wavelength band multiplexer 37. Wavelength band converter 36 converts the C-band optical signal into an L-band optical signal, and outputs the converted L-band optical signal to wavelength band multiplexer 37.

In step S7, wavelength band multiplexer 37 combines the S-, C-, and L-band optical signals to convert them into a wavelength multiplexed signal beam, and outputs the converted wavelength multiplexed signal beam to a corresponding one of the second to Q-th input ports of a corresponding one of <Q×1> WSSes 12a to 12m illustrated in FIG. 1.

In step S8, each of <Q×1> WSSes 12a to 12m sequentially performs selection on the S-, C-, and L-band wavelength multiplexed signal beams input from the Q input ports, and outputs the selected wavelength multiplexed signal beam from the output port to one input port of a respective one of <1×N> WSSes 21a to 21m of WXC unit 20.

In step S9, each of <1×N> WSSes 21a to 21m N-splits a respective one of wavelength multiplexed signal beams 1a to 1m input from the one input port into N beams, and output the N-split wavelength multiplexed signal beams from the N output ports to the N input ports of <N×1> WSSes 22a to 22m. For example, in the case of the first WSS 21a, wavelength multiplexed signal beams are output from the N output ports to the N input ports of the second to M-th output-side WSSes 22b to 22m excluding the first output-side WSS. Through such an output, the wavelength multiplexed signal beam is rerouted.

In step S10, each of output-side <N×1> WSSes 22a to 22m sequentially performs selection on the S-, C-, and L-band wavelength multiplexed signal beams input from the N input ports and output the selected S-, C-, and L-band wavelength multiplexed signal beam from one output port to one output route.

Effects of Embodiment

Effects of wavelength cross connect device 1 according to the embodiment of the present invention will now be described.

(1a) Wavelength cross connect device 1 includes wavelength band switching unit 10 and WXC unit 20. Wavelength band switching unit 10 is configured to: split each of wavelength multiplexed signal beams, in each of which optical signals of distinct wavelength bands (S, C, and L bands) are multiplexed and each of which is transmitted in multiple bands in a respective one of M optical transmission lines each including one or a plurality of optical fibers, into a predetermined number of wavelength multiplexed signal beams; perform wavelength band conversion on each of the split predetermined number of wavelength multiplexed signal beams; and output the predetermined number of wavelength multiplexed signal beams to which the wavelength band conversion has been performed.

WXC unit 20 includes: <1×N> WSSes 21a to 21m serving as a plurality of first input-side WSSes that respectively split the wavelength multiplexed signal beams output from wavelength band switching unit 10 and output split wavelength multiplexed signal beams; and <N×1> WSSes 22a to 22m serving as a plurality of second output-side WSSes mesh-connected to <1×N> WSSes 21a to 21m. The wavelength multiplexed signal beams split by <1×N> WSSes 21a to 21m are input to <N×1> WSSes 22a to 22m to perform rerouting and are then output to the output transmission lines Mo.

With this configuration, wavelength cross connect device 1 is able to: convert the wavelength bands of a wavelength multiplexed signal beam, in which optical signals of distinct wavelength bands are multiplexed and which is transmitted in multiple bands, with the wavelength band switching unit; and then perform rerouting on the converted wavelength multiplexed signal beam with the WXC unit to be output to a route on the output side.

Accordingly, in multi-band transmission system 40 (FIG. 4), in which a plurality of nodes to which the wavelength cross connect device is applied are linked to one another, wavelength band conversion can be performed on a link basis and on a wavelength basis as described later. By this conversion, a wavelength (wavelength C1 of C band, for example) of a vacant wavelength band of an optical transmission line between nodes 40a and 40b can be used by the conversion by wavelength cross connect device 1 located on the forward side of the segment between nodes 40a and 40b. In this manner, as a wavelength of a wavelength band of a wavelength-unused segment can be made usable, the use capacity of the network can be increased. That is, the efficiency of utilizing the network in the multi-band transmission system can be increased.

Figure 4:
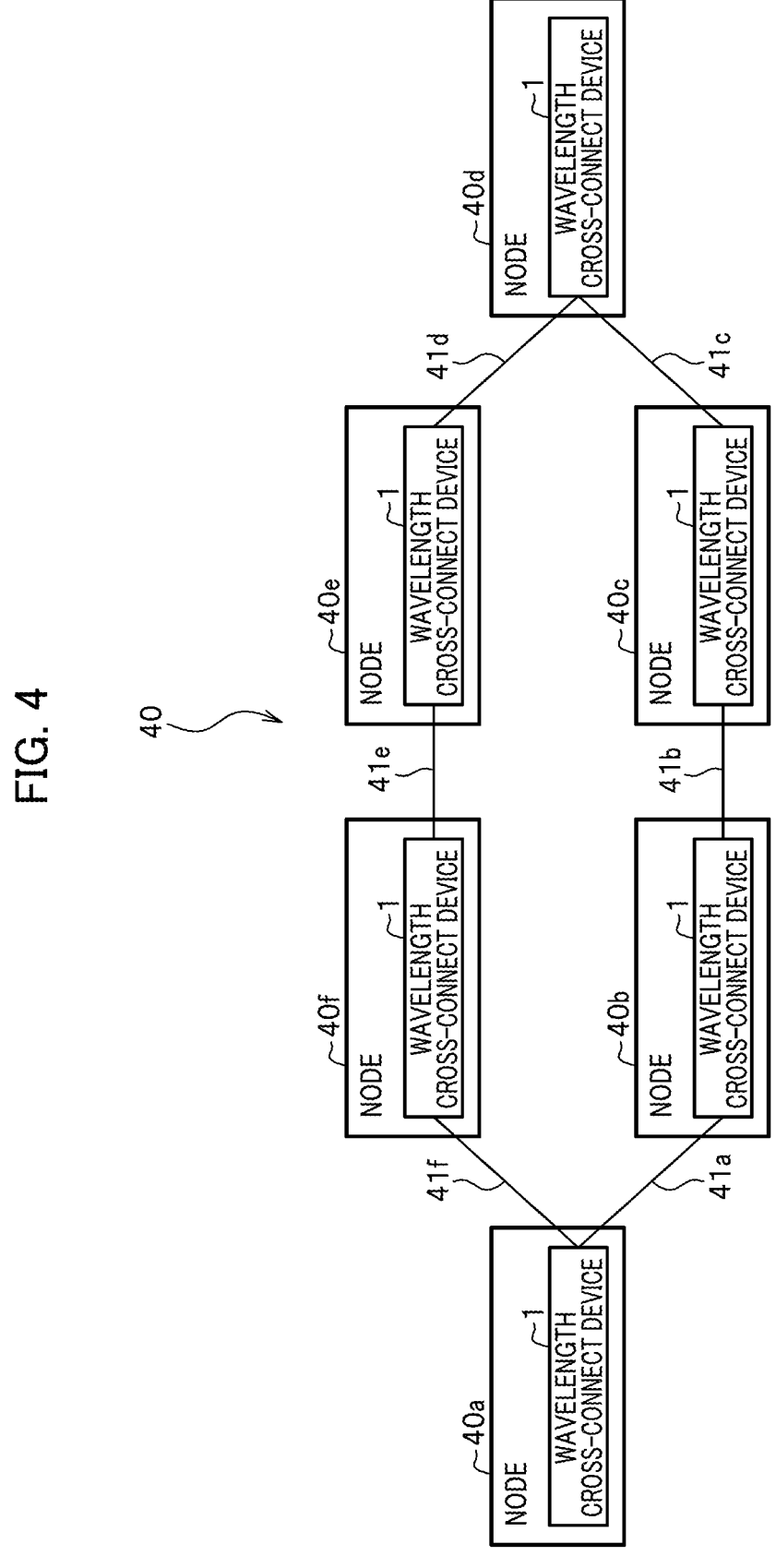
FIG. 4 is a block diagram illustrating the configuration of a multi-band transmission system formed by connecting nodes each including the wavelength cross connect device of the embodiment in a ring-like structure with optical transmission lines.

Multi-band transmission system (also referred to as system) 40 illustrated in FIG. 4 includes nodes 40a, 40b, 40c, 40d, 40e, and 40f, each of which serves as a communication device including a wavelength cross connect device 1 and which are connected in a ring-like structure with optical transmission lines 41a, 41b, 41c, 41d, 41e, and 41f formed of optical fibers.

The link in the above-mentioned "on a link basis" is the unit of optical transmission line 41a that connects the segment between two adjacent nodes (nodes 40a and 40b, for example) in the system 40. In other words, it is a unit of a segment between two adjacent nodes.

According to the conventional technique, for example, in a case where optical signals of distinct wavelength bands are transmitted through a plurality of paths using multi-band transmission in nodes 40a-40b-40c-40d via optical transmission lines 41a, 41b, and 41c, with node 40a being the start point and node 40d being the end point, the transmission in one path is limited to transmission in one wavelength band. Note that "in nodes 40*a*-40*b*-40*c*-40*d***"* is also stated as "in nodes 40*a* . . . 40*d*".

For example, in a case where S-, C-, and L-band optical signals are transmitted in multiple bands in nodes 40*a* . . . 40*d*, a path 1 passing through optical transmission lines 41*a* to 41*c* is limited to transmission of an S-band optical signal, a path 2 is limited to transmission of a C-band optical signal, and path 3 is limited to transmission of an L-band optical signal.

Here, the multi-band transmission has a characteristic in that power is transferred from an optical signal having a short wavelength to an optical signal having a long wavelength. For this reason, in many cases in the above example, the transmission performance of transmitting the S-band optical signal in path 1 is poor, the transmission performance of transmitting the C-band optical signal in path 2 is normal, and the transmission performance of transmitting the L-band optical signal in path 3 is high. In this manner, variations in the transmission performance occur among paths 1, 2, and 3.

The transmission performance also depends on parameters of a device (optical product) such as an optical fiber, such as a transmission band and a loss amount as the performance thereof, and on stimulated Raman scattering (SRS), which is a nonlinear optical effect. The above parameters have strong band dependencies. As the transmission performance depends on the wavelength band in use as described above, variations occur among distinct wavelength bands.

In contrast, the embodiment is able to change the wavelength bands for each one segment (on a link basis) in nodes 40*a* . . . 40*d* by wavelength cross connect device 1.

Figures 5, 6:
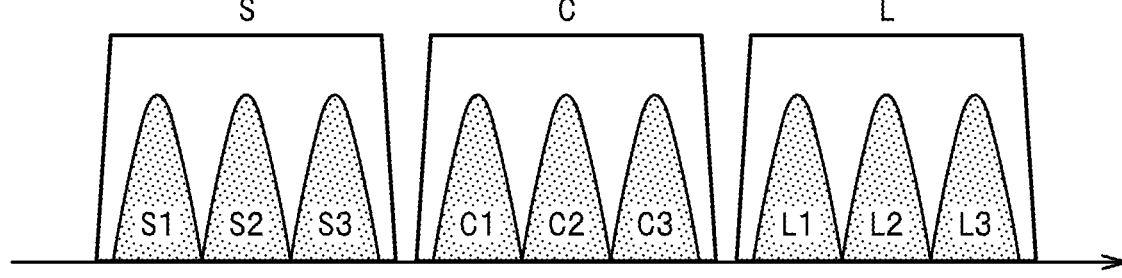
FIG. 5 is a diagram illustrating a table of distinct wavelength bands to be transmitted in the respective paths between the nodes in the multi-band transmission system illustrated in FIG. 4.
FIG. 6 is a diagram illustrating the wavelengths in S, C, and L bands as distinct wavelength bands.

For example, as illustrated in FIG. 5, in path 1 through nodes 40*a*-40*b*-40*c*-40*d*, the first segment (between nodes 40*a* and 40*b*) is caused to transmit an S-band optical signal, and the second segment (between nodes 40*b* and 40*c*) is caused to transmit a C-band optical signal. The third segment (between nodes 40*c* and 40*d*) is caused to transmit an L-band optical signal. In path 2, the first segment is caused to transmit a C-band optical signal, the second segment is caused to transmit an L-band optical signal, and the third segment is caused to transmit an S-band optical signal. In path 3, the first segment is caused to transmit an L-band optical signal, the second segment is caused to transmit an S-band optical signal, and the third segment is caused to transmit a C-band optical signal.

When optical signals of different wavelength bands are transmitted in paths 1, 2, and 3 in the segments as described above, the transmission performances of the distinct wavelength bands in the respective paths 1, 2, and 3 in the segments are averaged. This averaging reduces the variations in transmission performance among paths 1 to 3. As the variations are reduced, the efficiency of utilizing the network in the multi-band transmission system is increased.

Next, a description will be given of the effect of being able to perform wavelength band conversion on a wavelength basis. Assume that, as illustrated in FIG. 6, S band of an optical signal includes wavelengths S1, S2, and S3, C band includes wavelengths C1, C2, and C3, and L band includes wavelengths L1, L2, and L3.

In the conventional technique, one path set in all the segments is limited to one wavelength band. In this embodiment, however, wavelength cross connect device 1 can set any wavelength in the distinct wavelength bands for each of paths 1, 2, and 3 in each of the segments in 40*a*-40*b*-40*c*-40*d* nodes. For example, wavelength S1 of S band can be set in path 1 of optical transmission line 41*a* in the segment between nodes 40*a* and 40*b*, wavelength C1 of C band can be set in path 2 of optical transmission line 41*b* in the segment between nodes 40*b* and 40*c*, wavelength L1 of L band can be set in path 3 of optical transmission line 41*c* in the segment between nodes 40*c* and 40*d*, and an optical signal can be transmitted at set wavelengths S1, C1, and L1.

In the case of this embodiment being able to perform wavelength band conversion on a wavelength basis in this manner, it is possible to avoid the constraint on wavelength continuity of the conventional technique. The wavelength continuity constraint means the necessity of continuous transmission at the same wavelength in one wavelength band in one path in nodes 40*a* . . . 40*d*.

Figure 7:
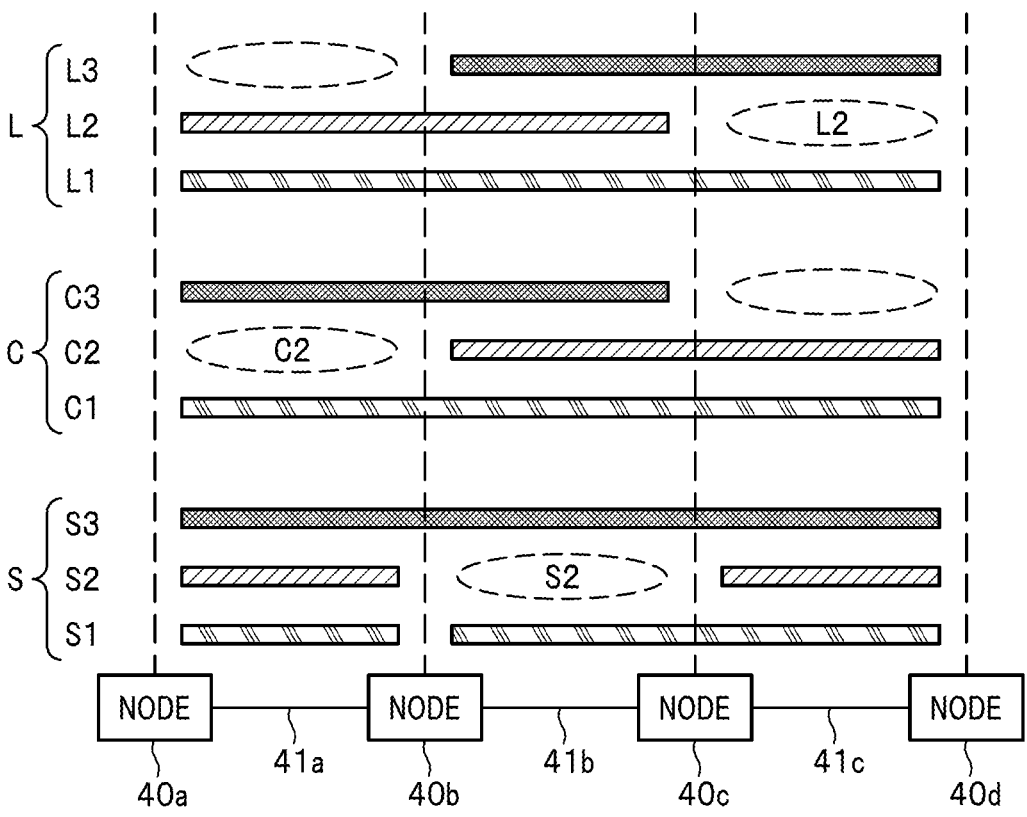
FIG. 7 is a diagram for explaining wavelength continuity constraints, and illustrates optical signals of respective wavelengths in S, C, and L bands, which are distinct wavelength bands, to be transmitted among a plurality of nodes.

For example, assume that, as illustrated in FIG. 7, wavelengths S1, S2, and S3 of S band, wavelengths C1, C2, and C3 of C band, and wavelengths L1, L2, and L3 of L band are set in nodes 40*a* . . . 40*d*, in the segments other than the segments indicated by the five elliptical dashed-line frames. In this case, in the case of the conventional technique, as the same wavelength of the same path collides in the wavelength-unused segments indicated by the elliptical dashed-line frames, the wavelength cannot be used due to the wavelength continuity constraint. For example, in the wavelength-unused segment indicated by the elliptical dashed-line frame in C band between nodes 40*a* and 40*b*, as wavelength C2 is already set between nodes 40*b* and 40*d*, the same wavelength C2 colliding with this cannot be set.

In this embodiment, however, as wavelength band conversion can be performed on a wavelength basis by wavelength cross connect device 1, it is possible to set wavelength C2 shown in the elliptical dashed-line frame in C band between nodes 40*a* and 40*b*. Further, it is possible to set wavelength S2 shown in the elliptical dashed-line frame in S band between nodes 40*b* and 40*c*, and set wavelength L2 shown in the elliptical dashed-line frame in L band between nodes 40*c* and 40*d*. In this case, it is possible to transmit an optical signal between nodes 40*a* and 40*b* using wavelength C2 in wavelength band C, between nodes 40*b* and 40*c* using wavelength S2 in wavelength band S, and between nodes 40*c* and 40*d* using wavelength L2 in wavelength band L.

In this way, an optical signal can be transmitted using the unused wavelengths indicated in the elliptical dashed-line frames so that wavelength collisions is avoidable. This makes it possible to increase the use capacity of the network. That is, the efficiency of utilizing the network of the multi-band transmission system can be increased.

Further, by such a conversion for each wavelength in a wavelength band, it is possible to avoid the capacity constraint due to inter-band stimulated Raman scattering that occurs in S band.

Example 1 of Path Setting

Figure 8:
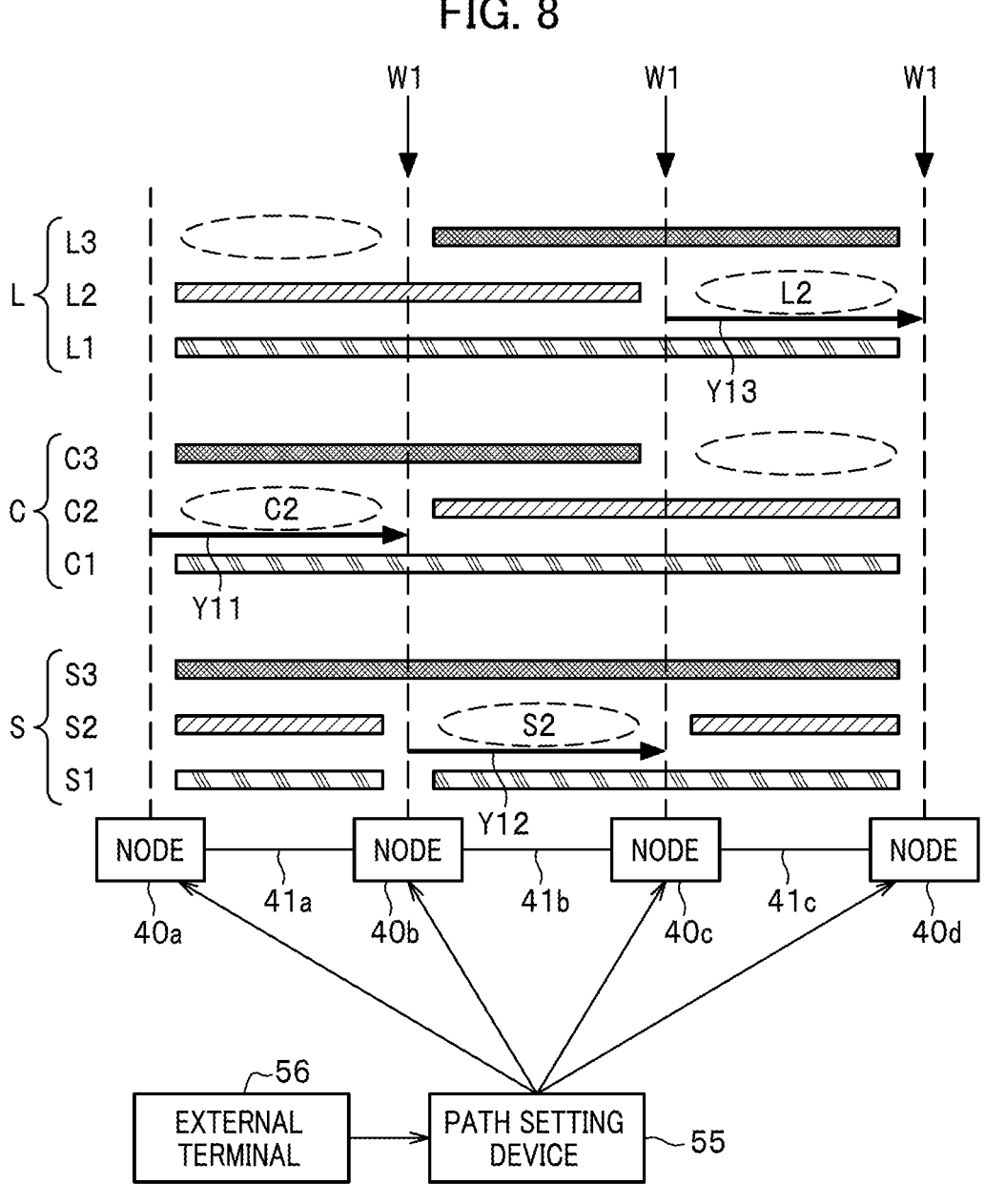
FIG. 8 is an explanatory diagram of Example 1 of path setting.

Here, Example 1 of path setting will be described with reference to FIG. 8.

Path setting device 55 is connected to each of nodes 40*a* to 40*d*. External terminal 56 such as a personal computer that issues path setting orders is connected to path setting device 55. The plurality of arrows W1 indicates wavelength band switching points.

Path setting device 55 manages the wavelength usage status among nodes 40*a* . . . 40*d*. For example, in a case where an order for setting a path in nodes 40*a* . . . 40*d* is newly added by external terminal 56, as it is not possible to set the path through nodes 40*a* . . . 40*d* using the same wavelength, path setting device 55 checks the status of unused wavelengths.

Path setting device 55 issues the instructions described in the following (1) to (4). based on the checking of the status of the unused wavelengths.

(1) To set an optical path in optical transmission line 41*a*, path setting device 55 instructs node 40*a* to transmit wavelength C2 of C band to node 40*b* as indicated by arrow Y11.

(2) To set an optical path in optical transmission line 41*b*, path setting device 55 instructs node 40*b* to switch C band of the input optical signal of wavelength C2 to S band, convert the optical signal into an optical signal of wavelength S2, and transmit the converted optical signal to node 40*c* as indicated by arrow Y12.

(3) To set an optical path in optical transmission line 41*c*, path setting device 55 instructs node 40*c* to switch S band of the input optical signal of wavelength S2 to the L band, convert the optical signal into an optical signal of wavelength L2, and transmit the converted optical signal to node 40*d* as indicated by arrow Y13.

(4) Path setting device 55 may instruct, to node 40*d*, restoration to wavelength S2 of S band. This is performed in a case where the available wavelength bands at the start point and the end point of the path have been determined.

Figure 9:
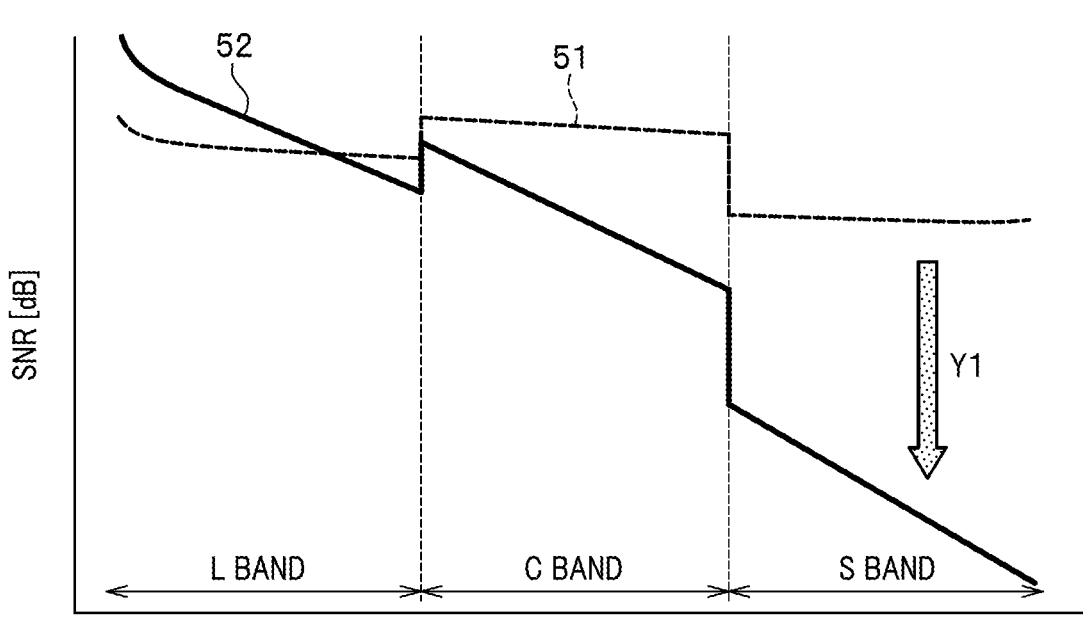
FIG. 9 is a graph illustrating the optical signal-to-noise ratios (SNRs) in S, C, and L bands.

Next, as illustrated in FIG. 9, in a case where no inter-band stimulated Raman scattering occurs in S, C, and L bands, the optical signal-to-noise ratios (SNRs [dB] on the ordinate axis) in S, C, and L bands are substantially the same as indicated by the dashed line 51.

Figure 10:
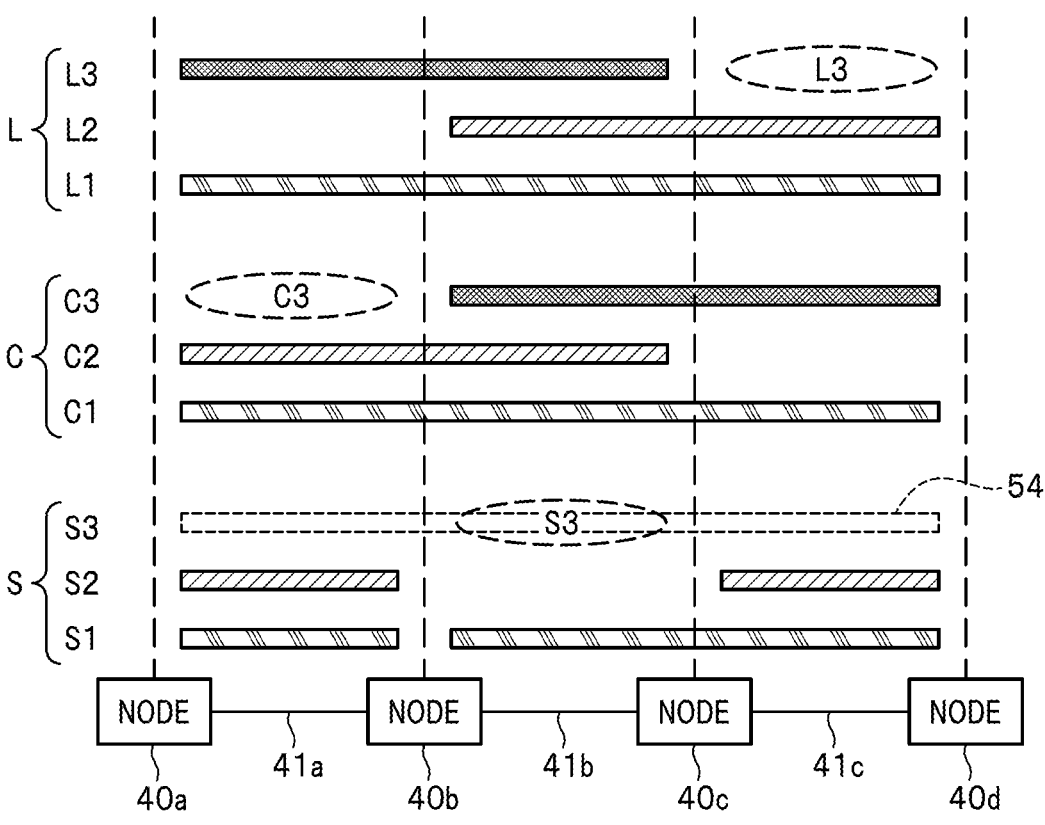
FIG. 10 is a diagram for explaining the capacity constraints due to inter-band stimulated Raman scattering, and illustrates optical signals of the respective wavelengths of S, C, and L bands, which are distinct wavelength bands to be transmitted among a plurality of nodes.

On the other hand, in a case where inter-band stimulated Raman scattering occurs, the SNRs in S, C, and L bands become lower as the frequency in the wavelength becomes higher, or, in other words, as the wavelength in the wavelength bands becomes shorter, as indicated by the solid line 52. The SNR is worst in S band. Therefore, as indicated by the dashed-line horizontal bar denoted by reference numeral 54 in FIG. 10, optical signal transmission via S band cannot be performed through nodes 40*a*-40*b*-40*c*-40*d*.

However, as this embodiment makes it possible to perform wavelength band conversion on a wavelength basis by wavelength cross connect device 1, and accordingly, wavelengths of distinct wavelength bands are to be set in the wavelength-unused segments indicated by the elliptical dashed-line frames as follows. That is, wavelength C3 is set between nodes 40*a* and 40*b*, wavelength S3 is set between nodes 40*b* and 40*c*, and wavelength L3 is set between nodes 40*c* and 40*d*. With this setting, the optical signal can be transmitted between nodes 40*a* and 40*b* using wavelength C3 in wavelength band C, between nodes 40*b* and 40*c* using wavelength S3 in wavelength band S, and between nodes 40*c* and 40*d* using wavelength L3 in wavelength band L, while reducing the influence of the inter-band stimulated Raman scattering.

Example 2 of Path Setting

Figure 11:
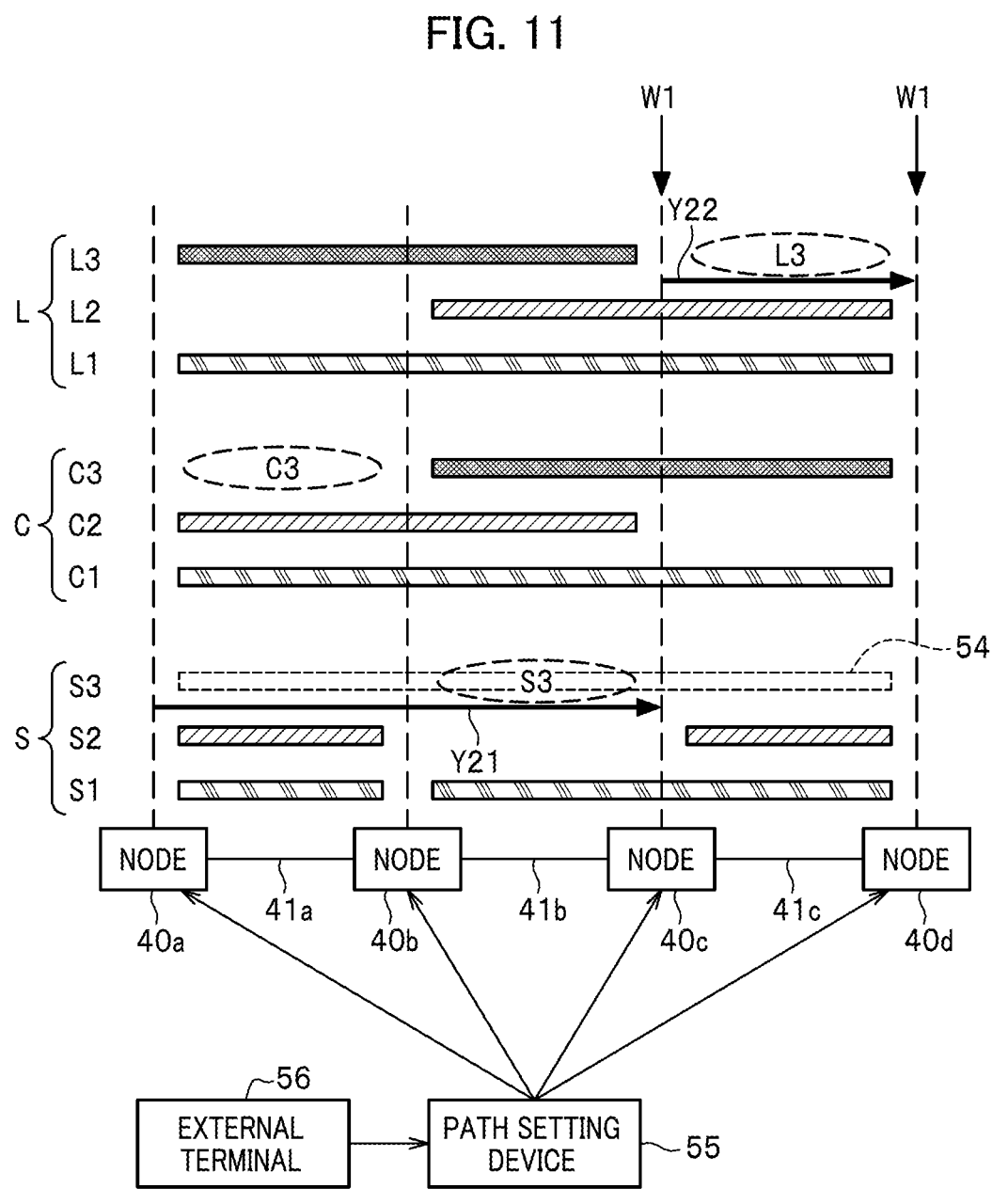

Here, Example 2 of path setting will be described with reference to FIG. 11. Note that path setting device 55 to which external terminal 56 is connected is connected to each of nodes 40*a* to 40*d*, as in the example illustrated in FIG. 8.

Path setting device 55 manages the wavelength usage status among nodes 40*a* . . . 40*d*. For example, in a case where an order for setting a path through nodes 40*a* . . . 40*d* is newly added by external terminal 56, path setting device

55 checks the status of the unused wavelengths. In the case of the example illustrated in FIG. 11, it is possible to set a path through nodes 40*a* to 40*d* at wavelength S3. However, in a case where it is specified as a setting condition that wavelength S3 can be set for up to two consecutive links, for example, it is not possible to set any path at wavelength S3 to optical transmission lines 41*a*, 41*b*, and 41*c*.

Path setting device 55 then issues the instructions described in the following (1) to (4), based on the checking of the status of unused wavelengths.

(1) To set an optical path in optical transmission line 41*a*, path setting device 55 instructs node 40*a* to transmit an optical signal of wavelength S3 of S band to node 40*b* as indicated by arrow Y21.

(2) To set an optical path in optical transmission line 41*b*, path setting device 55 instructs node 40*b* to transmit the input optical signal of wavelength S3 as is to node 40*c* as indicated by arrow Y21.

(3) To set an optical path in optical transmission line 41*c*, path setting device 55 instructs node 40*c* to switch S band of the input optical signal of wavelength S3 to L band, converting the optical signal into an optical signal of wavelength L3, and transmit the optical signal to node 40*d*, as indicated by arrow Y22.

(4) Path setting device 55 may instruct, to node 40*d*, restoration to wavelength S2 of S band. This is performed in a case where the available wavelength bands at the start point and the end point of the path have been determined.

As described above, as it is possible to transmit an optical signal through nodes 40*a* . . . 40*d* while avoiding the inter-band stimulated Raman scattering, it is also possible to avoid the capacity constraint due to the inter-band stimulated Raman scattering. Accordingly, it is possible to increase the use capacity of the network in the multi-band transmission system and increase the efficiency of utilizing the network.

That is, in general, the network efficiency drops from 100% due to the wavelength continuity constraint, and further drops due to the capacity constraint due to the influence caused by inter-band stimulated Raman scattering. However, with wavelength cross connect device 1 of this embodiment, it is possible to reduce the decrease in the network efficiency.

(2a) Wavelength band switching unit 10 includes <1×Q> WSSes 11*a* to 11*m* as a plurality of (M) second input-side WSSes that respectively split wavelength multiplexed signal beams 1*a* to 1*m* of the optical transmission lines into a predetermined number of wavelength multiplexed signal beams to be output. Wavelength band switching unit 10 also includes the M sets of the plurality of wavelength band switch processing units #1 to #j that output wavelength multiplexed signal beams resulting in converting the wavelength bands of the optical signals multiplexed in the wavelength multiplexed signal beams Q-split and output by <1×Q> WSSes 11*a* to 11*m* into different wavelength bands. Wavelength band switching unit 10 further includes <Q×1> WSSes 12*a* to 12*m* as the second output-side WSSes that select, one by one, the wavelength multiplexed signal beams output from wavelength band switch processing units #1 to #j and the wavelength multiplexed signal beams output directly from <1×Q> WSSes 11*a* to 11*m*, and output the selected wavelength multiplexed signal beams to <1×N> WSSes 21*a* to 21*m* of WXC unit 20.

With this configuration, in a case where the amount of communication of the wavelength multiplexed signal beams to be transmitted in multiple bands increases and it is desirable to increase the number of wavelength band switches in wavelength band switching unit 10, the number of wavelength band switches can be increased in units of wavelength band switch processing unit (for example, by a unit of wavelength band switch processing unit #1), and accordingly, can be easily increased.

(3a) Wavelength band switch processing units #1 to #*j* each includes wavelength band demultiplexer 31, wavelength band converters 32 and 33 as the input-side converter, <K×K> WSS 34 as the specific WSS, wavelength band converters 35 and 36 as the output-side converter, and wavelength band multiplexer 37.

Wavelength band demultiplexer 31 demultiplexes and outputs optical signals of distinct wavelength bands multiplexed in the wavelength multiplexed signal beam output from one output port of a corresponding one of input-side <1×Q> WSSes 11*a* to 11*m*.

Wavelength band converters 32 and 33 serving as input-side converters convert, of the optical signals of distinct wavelength bands demultiplexed by wavelength band demultiplexer 31, an optical signal of a wavelength band other than a predetermined specific wavelength band into an optical signal of the specific wavelength band.

<K×K> WSS 34 has the same number of input ports and the same number of output ports as the number of signals demultiplexed by wavelength band demultiplexer 31, is capable of processing only the specific wavelength band, and outputs, from the output ports, the specific wavelength band having been converted by wavelength band converters 32 and 33 and input from the input ports or the specific wavelength band among the above-described demultiplexed distinct wavelength bands, so as to be converted into predetermined wavelength band.

Wavelength band converters 35 and 36 serving as output-side converters convert the optical signals of the specific wavelength band output from the output ports into optical signals of predetermined wavelength bands.

Wavelength band multiplexer 37 combines the optical signals of distinct wavelength bands output from wavelength band converters 35 and 36 to convert the optical signals into a wavelength multiplexed signal beam, and outputs the converted wavelength multiplexed signal beam to a corresponding one of output-side <Q×1> WSSes 12*a* to 12*m*.

With this configuration, <K×K> WSS 34 outputs, from the output ports, the specific wavelength band converted by the input-side wavelength band converters 32 and 33 or the specific wavelength band among the distinct wavelength bands demultiplexed by wavelength band demultiplexer 31, so as to be converted into predetermined wavelength bands. As it is possible to convert the respective optical signals of the distinct wavelength bands into optical signals of predetermined wavelength bands using the single <K×K> WSS 34 as described above, wavelength band switch processing units #1 to #*j* can be reduced in size.

Another Configuration of Wavelength Band Switch Processing Unit

Figure 12:
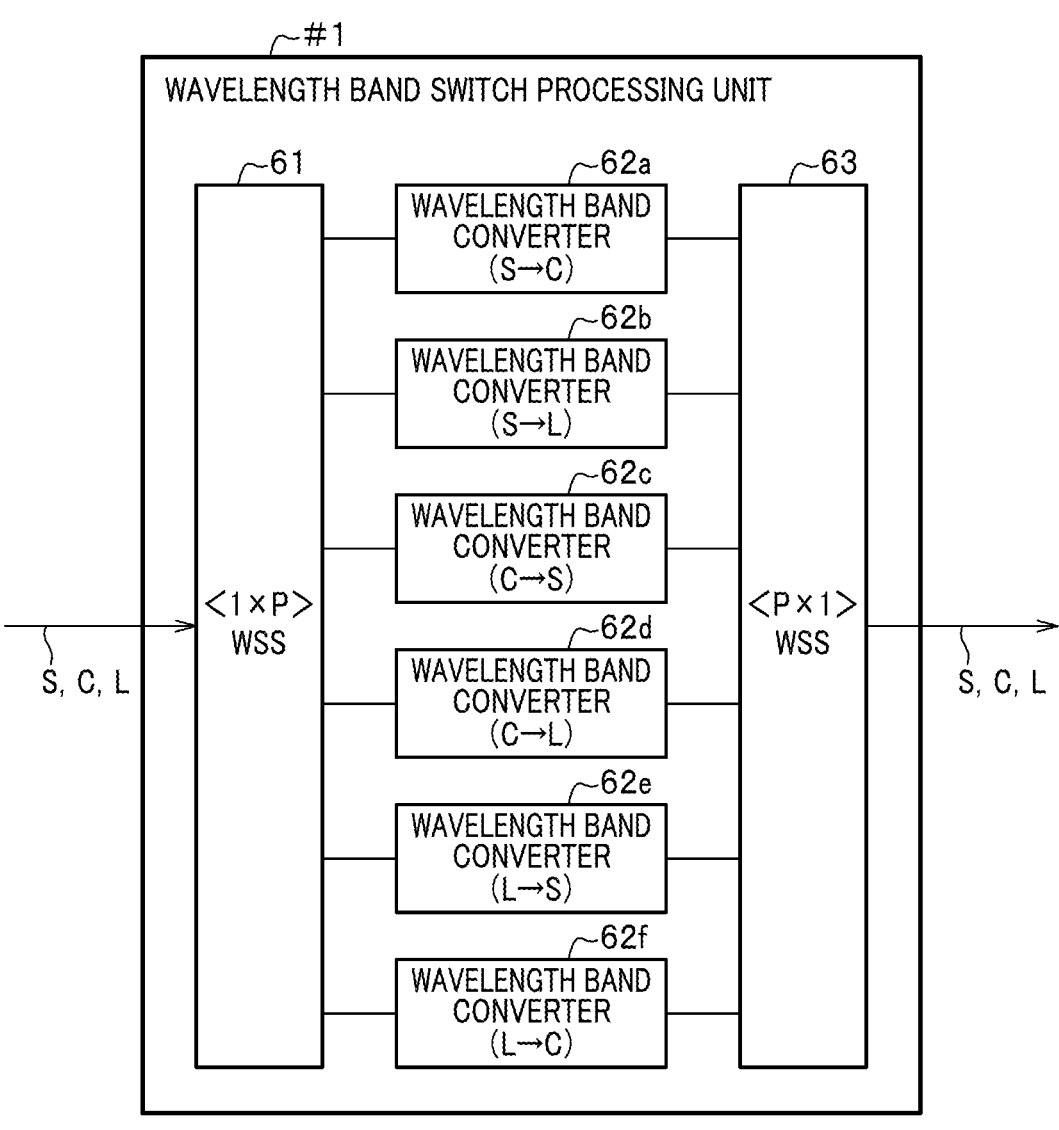
FIG. 12 is a block diagram illustrating another configuration of a wavelength band switch processing unit of the wavelength cross connect device according to the embodiment.

Other than the configuration illustrated in FIG. 2, wavelength band switch processing units #1 to #*j* illustrated in FIG. 1 may be configured as illustrated in FIG. 12, in which wavelength band switch processing unit #1 is shown as a representative.

Wavelength band switch processing unit #1 illustrated in FIG. 12 includes <1×P> WSS 61, P wavelength band converters 62*a*, 62*b*, 62*c*, 62*d*, 62*e*, and 62*f*, and <P×1> WSS 63. P is the same number as the number of the output ports of <1×P> WSS 61, the number of the input ports of <P×1> WSS 63, and the number of wavelength band converters 62*a* to 62*f*.

Here, either <1×P> WSS 61 or <P×1> WSS 63 may be an optical coupler such as a 1×P or P×1 optical fiber coupler. Note that <1×P> WSS 61 forms the first WSS described in the claims. <P×1> WSS 63 forms the second WSS described in the claims.

<1×P> WSS 61 P-splits the S-, C-, and L-band optical signals of distinct wavelength bands multiplexed in the wavelength multiplexed signal beam input from <1×Q> WSS 11*a* (FIG. 1). This P-splitting is performed including a predetermined number of optical signals in the same wavelength band. In this example, the P-splitting is performed including two optical signals of S band, two optical signals of C band, and two optical signals of L band, as follows. That is, the S-band optical signal is output to the wavelength band converters 62*a* and 62*b*, the C-band optical signal is output to the wavelength band converters 62*c* and 62*d*, and the L-band optical signal is output to the wavelength band converters 62*e* and 62*f*.

Wavelength band converter 62*a* converts S band into a C-band optical signal, wavelength band converter 62*b* converts S band into an L-band optical signal, and the converted optical signals are output to input ports of <P×1> WSS 63. Wavelength band converter 62*c* converts C band into an S-band optical signal, wavelength band converter 62*d* converts C band into an L-band optical signal, and the converted optical signals are output to input ports of <P×1> WSS 63. Wavelength band converter 62*e* converts L band into an S-band optical signal, wavelength band converter 62*f* converts L band into a C-band optical signal, and the converted optical signals are output to input ports of <P×1> WSS 63.

<P×1> WSS 63 multiplexes the S, C, and L bands each of which is input in two to the P input ports and outputs the wavelength multiplexed signal beam to <Q×1> WSS 12*a* illustrated in FIG. 1.

With this configuration, wavelength band switch processing unit #1 with a simple configuration can convert distinct wavelength bands multiplexed in a wavelength multiplexed signal beam of a corresponding one of the input transmission paths into optical signals of other distinct wavelength bands.

Other than the above, wavelength band switch processing unit #1 illustrated in FIG. 2 or FIG. 12 may use a WSS that can handle at least two wavelength bands. Also. WSSes capable of handling at least two wavelength bands may be used for input-side WSSes 11*a* to 11*m* and output-side WSSes 12*a* to 12*m* of wavelength band switching unit 10 illustrated in FIG. 1 and may be used for input-side WSSes 21*a* to 21*m* and output-side WSSes 22*a* to 22*m* of WXC unit 20. For example, instead of WSS 34 capable of processing S, C, and L bands as illustrated in FIG. 2, a WSS for S band and a WSS for C band and L band may be used as one set. Further, in a case where E, S, C, and L bands are used, a WSS for E-band and S band and a WSS for C band and L band may be used. That is, each WSS may be configured to be capable of processing half the four wavelength bands.

Modification 1 of Embodiment

Figure 13:
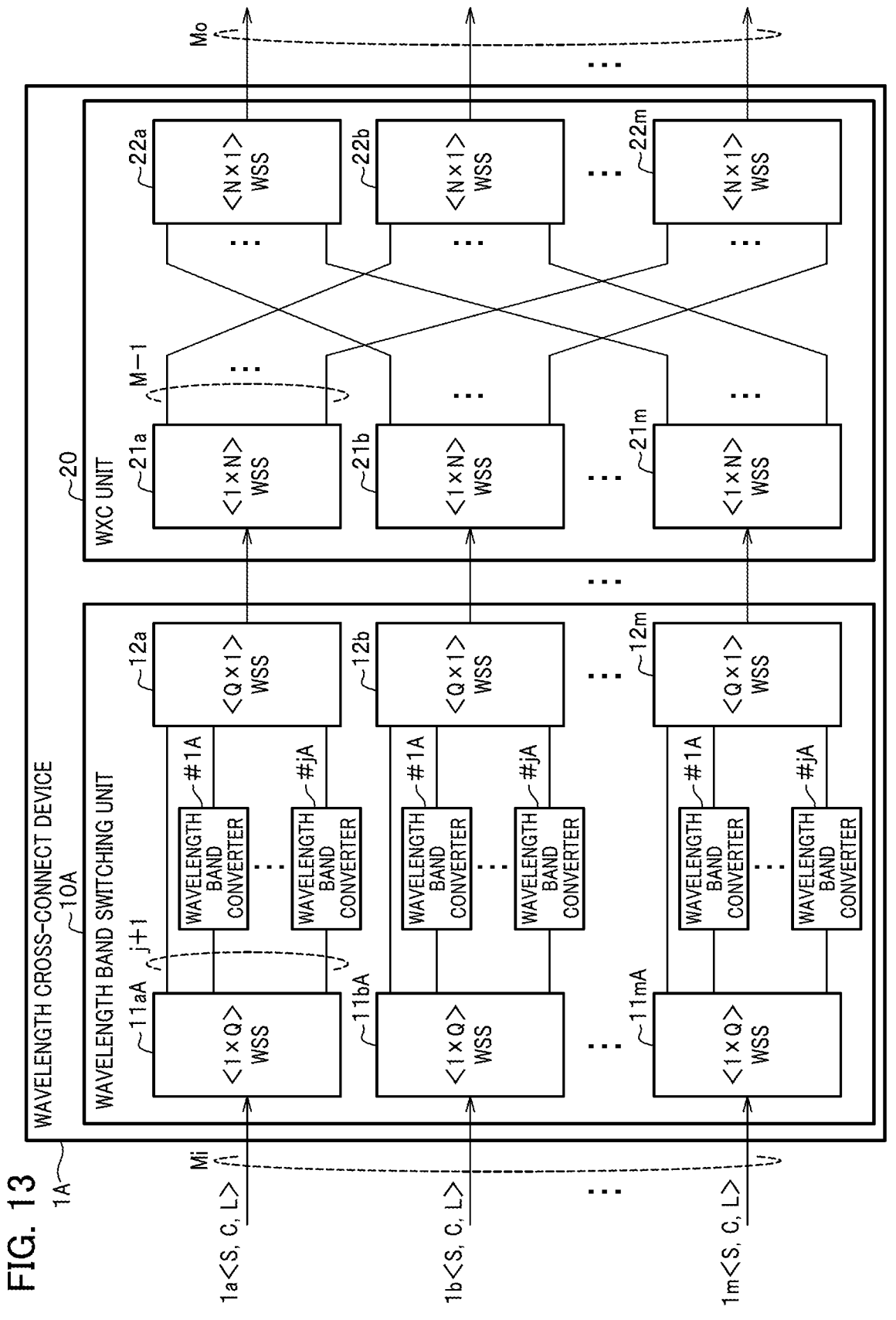
FIG. 13 is a block diagram illustrating the configuration of a wavelength cross connect device according to Modification 1 of this embodiment.

FIG. 13 is a block diagram illustrating the configuration of a wavelength cross connect device according to Modification 1 of the embodiment of the present invention.

Wavelength cross connect device 1A of Modification 1, illustrated in FIG. 13, differs from wavelength cross connect device 1 of the above-described embodiment (FIG. 1) in including input-side <1×Q> WSSes 11*a*A to 11*m*A and wavelength band converters #1A to #jA of wavelength band switching unit 10A. instead of input-side <1×Q> WSSes 11a to 11m and wavelength band switch processing units #1 to #j of wavelength band switching unit 10 (FIG. 1).

As input-side <1×Q> WSSes 11aA to 11mA have the same functions, the first <1×Q> WSS 11aA will now be described as a representative. The first <1×Q> WSS 11aA Q-splits wavelength multiplexed signal beam 1a transmitted in multiple bands (wavelength bands of S, C, and L bands) into optical signals each of which is either an S-, C-, or L-band optical signal, and outputs the optical signal of one of the Q-split wavelength bands from one of the Q output ports. For example. an L-band optical signal is output from the first output port of the Q output ports, an S-band optical signal is output from the second output port, and a C-band optical signal is output from the j-th output port.

Wavelength band converters #1A to #jA perform processing of converting the wavelength bands (S, C, and L bands) output from a corresponding one of input-side <1×Q> WSSes 11aA to 11mA into different wavelength bands. For example, wavelength band converter #1A connected to an output port of <1×Q> WSS 11aA is configured to convert S band of the wavelength bands into C band, and wavelength band converter #jA is configured to convert C band into L band.

The L-band optical signal output from the first output port of <1×Q> WSS 11aA is output to the first input port of output-side <Q×1> WSS 12a. The S-band optical signal output from the second output port is output to wavelength band converter #1A, and is converted into a C-band optical signal. The C-band optical signal output from the j-th output port is output to wavelength band converter #jA. and is converted into an L-band optical signal.

Wavelength cross connect device 1A of Modification 1 can also achieve the same effects as those of the embodiment described above. Furthermore, as wavelength band converters #1A to #jA of Modification 1 have a simpler and smaller configuration than wavelength band switch processing units #1 to #j of the embodiment, wavelength cross connect device 1A can be accordingly reduced in size.

Other than the above, wavelength band converters #1A to #jA may shift a wavelength of the wavelength bands of wavelength multiplexed signal beams 1a to 1m (e.g., wavelength S1 of S band) to the long-wavelength side or to the short-wavelength side, to convert the wavelength into a wavelength of a different wavelength band (wavelength C2 of C band).

This shifting is configured and executed as follows. For example, wavelength band converter #1A connected to input-side WSS 11aA (<1×Q> WSS 11aA) is configured to shift wavelength S1 of S band of an optical signal to the long-wavelength side by a shift amount of <+3> so as to be converted into wavelength C1 of C band. as indicated by arrow Y1 in FIG. 14. As a result, wavelength S1 of S band of wavelength multiplexed signal beam 1a split by input-side WSS 11aA is converted into wavelength C1 of C band by wavelength band converter #1A. and is output to the second input port of output-side WSS 12b.

Figure 14:
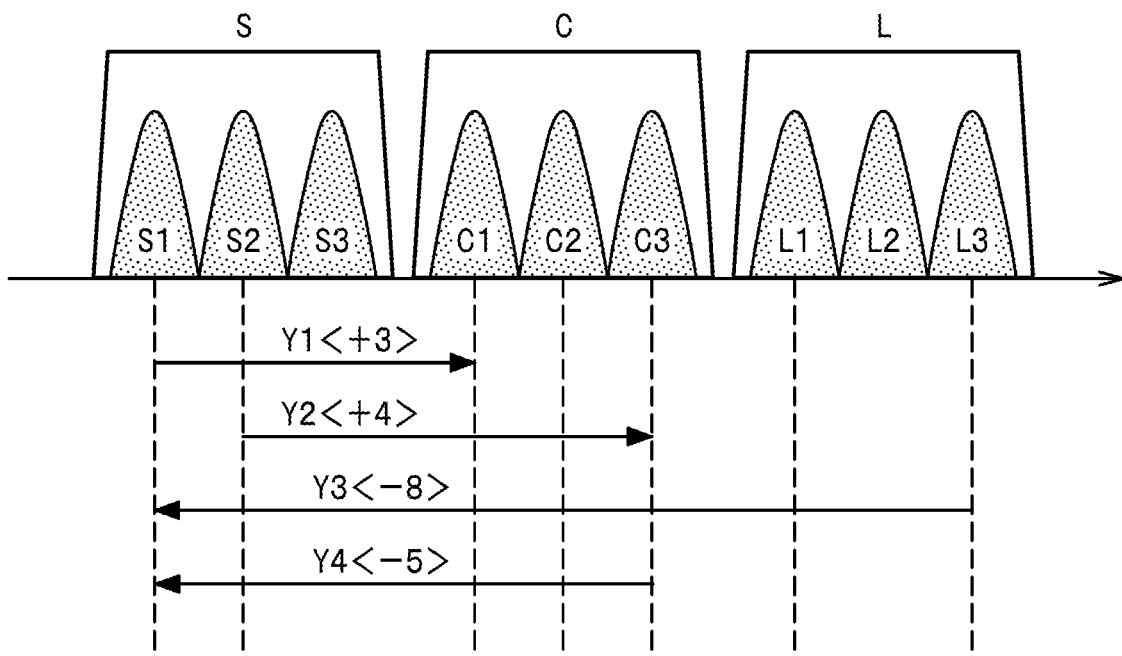
FIG. 14 is an explanatory diagram of processing of converting a wavelength in a wavelength band into a wavelength in a different wavelength band.

Likewise, wavelength band converter jA connected to input-side WSS 11aA is configured to shift wavelength S2 of S band of the optical signal to the long-wavelength side by a shift amount of <+4> so as to be converted into wavelength C3 of C band, as indicated by arrow Y2 in FIG. 14. As a result, wavelength S2 of S band of the split wavelength multiplexed signal beam 1a is converted into wavelength C3 of C band by wavelength band converter #jA. and is output to the j-th input port of output-side WSS 12b.

Also, wavelength band converter #1A of another set (1+j) connected to input-side WSS 11aA is configured to shift wavelength L3 of L band of the optical signal to the short-wavelength side by a shift amount of <−8> so as to be converted into wavelength S1 of S band, as indicated by arrow Y3 in FIG. 14. As a result, wavelength L3 of L band of the split wavelength multiplexed signal beam 1a is converted into wavelength S1 of S band by wavelength band converter #1A of the other set (1+j), and is output to the first input port of the other set (1+j) of output-side WSS 12b.

Further, wavelength band converter #jA of the other set (1+j) connected to input-side WSS 11aA is configured to shift wavelength C3 of C band of the optical signal to the short-wavelength side by a shift amount of <−5> so as to be converted into wavelength S1 of S band. as indicated by arrow Y4 in FIG. 14. As a result, wavelength C3 of C band of the split wavelength multiplexed signal beam la is converted into wavelength S1 of S band by wavelength band converter #jA of the other set (1+j), and is output to the j-th input port of the other set (1+j) of output-side WSS 12b.

In this way, it is possible for wavelength band converters #1A to #jA of wavelength cross connect device 1A to perform wavelength conversion on wavelength multiplexed signal beams 1a to 1m over a plurality of wavelength bands on a wavelength basis.

Modification 2 of the Embodiment

Figure 15:
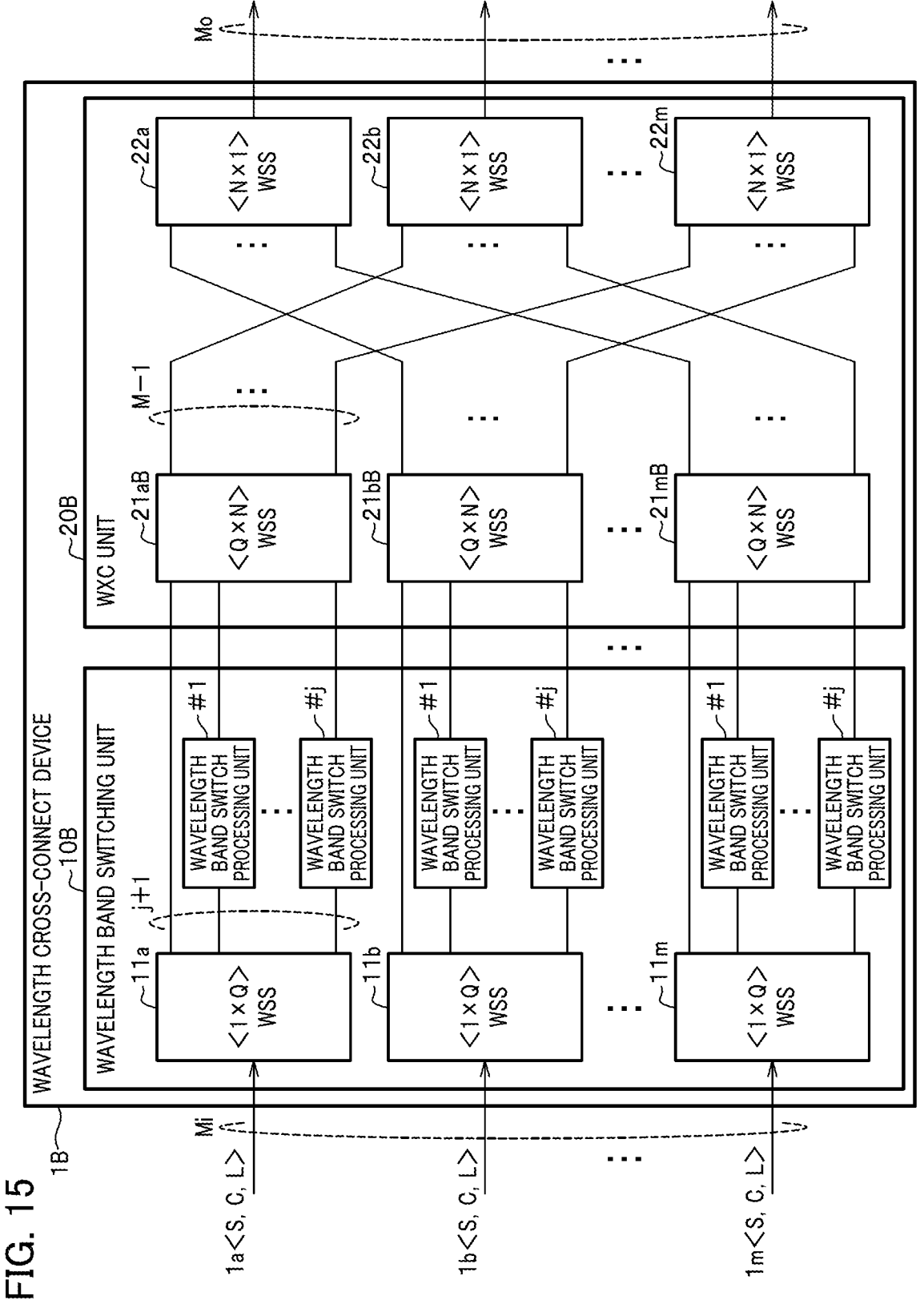
FIG. 15 is a block diagram illustrating the configuration of a wavelength cross connect device according to Modification 2 of this embodiment.

FIG. 15 is a block diagram illustrating the configuration of a wavelength cross connect device according to Modification 2 of the embodiment of the present invention.

Wavelength cross connect device 1B of Modification 2 illustrated in FIG. 15 differs from wavelength cross connect device 1 of the above-described embodiment (FIG. 1) in that wavelength band switching unit 10B does not include <Q×1> WSSes 12a to 12m (FIG. 1). Further, WXC unit 20B includes <Q×N> WSSes 21aB to 21mB instead of <1×N> WSSes 21a to 21m (FIG. 1), and the N output ports of <Q×N> WSSes 21aB to 21mB are mesh-connected to the N input ports of <N×1> WSSes 22a to 22m.

Note that <Q×N> WSSes 21aB to 21mB form the third input-side WSSes described in the claims.

<Q×N> WSSes 21aB to 21mB have Q input ports and N output ports, and perform processing of selectively outputting wavelength multiplexed signal beams input to the Q input ports from <1×Q> WSSes 11a to 11m and wavelength band switch processing units #1 to #j. to one output port of the N output ports.

With this configuration, it is possible to perform optical signal transmission between wavelength band switching unit 10B and WXC unit 20B with the use of optical devices (<Q×N> WSSes 21aB to 21mB) capable of transmitting N wavelength multiplexed signal beams.

<Q×N> WSSes 21aB to 21mB in wavelength cross connect device 1B illustrated in FIG. 15 can also be applied, by means of substitution in a similar manner, to wavelength cross connect device 1A illustrated in FIG. 13.

With wavelength cross connect device 1, 1A, or 1B described above, it is possible to reduce power consumption during operation by monitoring the usage status of wavelength band switch processing units #1 to #j or wavelength band converters #1A to #jA, and dynamically turning off the power. Also, the wavelength shift amount in wavelength band converters #1A to #jA can be selected as desired, and, in a case where any of wavelength band converters #1A to #jA fails, it is also possible to reduce the influence of the failure by substituting the failed wavelength band converter with another wavelength band converter by remote control.

Effects (1) A wavelength cross connect device includes: a wavelength band switching unit configured to split each of wavelength multiplexed signal beams, in each of which optical signals of respective distinct wavelength bands are multiplexed and each of which has been transmitted in multiple bands in a respective one of a plurality of optical transmission lines formed with one or a plurality of optical fibers, into a predetermined number of wavelength multiplexed signal beams, perform wavelength band conversion on each of the split predetermined number of wavelength multiplexed signal beams, and output each of the split predetermined number of wavelength multiplexed signal beams to which the wavelength band conversion has been performed; and a wavelength cross connect (WXC) unit including a plurality of first input-side WSSes configured to split and output respective wavelength multiplexed signal beams output from the wavelength band switching unit and a plurality of first output-side WSSes mesh-connected to the first input-side WSSes, the WXC unit configured to input the wavelength multiplexed signal beams split by the first input-side WSSes to the first output-side WSSes to perform rerouting and then output the rerouted wavelength multiplexed signal beams to output transmission lines.

With this configuration, the wavelength cross connect device is able to: convert the wavelength bands of a wavelength multiplexed signal beam, in which optical signals of distinct wavelength bands are multiplexed and which is transmitted in multiple bands, with the wavelength band switching unit; and then perform rerouting on the conversion result with the WXC unit to be output to a route on the output side.

Accordingly, in a multi-band transmission system, in which a plurality of nodes to which the wavelength cross connect device is applied are linked to one another (connected via optical transmission lines), wavelength band conversion can be performed on a link basis and on a wavelength basis. By this conversion, the wavelength (e.g., wavelength C1 of C band) of a vacant wavelength band of an optical transmission line of a segment between nodes can be used by conversion by the wavelength cross connect device located on the forward side of the segment between the nodes. In this manner, as a wavelength of a wavelength band of a wavelength-unused segment can be made usable, the use capacity of the network can be increased. That is, the efficiency of utilizing the network in the multi-band transmission system can be increased.

(2) In the wavelength cross connect device of (1), the wavelength band switching unit includes: a plurality of second input-side WSSes configured to split the wavelength multiplexed signal beam of each of the optical transmission lines into a predetermined number of wavelength multiplexed signal beams and output the split predetermined number of wavelength multiplexed signal beams; a plurality of wavelength band switch processing units configured to output wavelength multiplexed signal beams in which wavelength bands of optical signals multiplexed in the wavelength multiplexed signal beams split and output by the second input-side WSS are converted into different wavelength bands; and a second output-side WSS configured to select, one by one, the wavelength multiplexed signal beams output from the plurality of wavelength band switch processing units and the wavelength multiplexed signal beams output directly from the second input-side WSS, and output the selected wavelength multiplexed signal beam to the first input-side WSS of the WXC unit.

With this configuration, in a case where the amount of communication of the wavelength multiplexed signal beams to be transmitted in multiple bands increases and it is desirable to increase the number of wavelength band switches in the wavelength band switching unit, the number of wavelength band switches can be increased in units of wavelength band switch processing unit, and accordingly, can be easily increased.

(3) In the wavelength cross connect device of (2), the wavelength band switch processing unit includes: a wavelength band demultiplexer configured to demultiplex and output optical signals of distinct wavelength bands multiplexed in the wavelength multiplexed signal beam output from the second input-side WSS; an input-side converter configured to convert, of the demultiplexed optical signals of distinct wavelength bands, an optical signal of a wavelength band other than a predetermined specific wavelength band into an optical signal of the specific wavelength band; a specific WSS having a same number of input ports and a same number of output ports as a number of the demultiplexed optical signals, specific WSS being capable of processing only the specific wavelength band and configured to output, from the output ports, the specific wavelength band having been converted by the input-side converter and input from the input ports or the specific wavelength band among the demultiplexed distinct wavelength bands, so as to be converted into a predetermined wavelength band; an output-side converter configured to convert an optical signal of the specific wavelength band output from the output ports into an optical signal of a predetermined wavelength band; and a wavelength band multiplexer configured to combine the optical signals of the distinct wavelength bands from the output-side converter to convert them into a wavelength multiplexed signal beam and output the converted wavelength multiplexed signal beam to the second output-side WSS.

With this configuration, the specific WSS outputs, from the output ports, the specific wavelength band converted by the input-side converter or the specific wavelength band among the distinct wavelength bands demultiplexed by the wavelength band demultiplexer, so as to be converted into predetermined wavelength bands. As the optical signals of respective distinct wavelength bands can be converted into optical signals of predetermined wavelength bands using the single specific WSS as described above, the wavelength band switch processing units can be reduced in size.

(4) In the wavelength cross connect device of (2), the wavelength band switch processing unit includes: a first WSS configured to split distinct wavelength bands multiplexed in the wavelength multiplexed signal beam output from the second input-side WSS, resulting in optical signals including a predetermined number of optical signals of a same wavelength band; a same number of wavelength band converters as a number of the split optical signals, the wavelength band converters configured to convert the optical signals of the wavelength bands split by the first WSS into optical signals of different wavelength bands; and a second WSS configured to multiplex the optical signals of the respective wavelength bands converted by the wavelength band converters to convert them into a wavelength multiplexed signal beam, and outputs the converted wavelength multiplexed signal beam to the second output-side WSS.

With this configuration, the wavelength band switch processing unit with a simple configuration can convert the distinct wavelength bands multiplexed in a wavelength multiplexed signal beam of a corresponding one of the input transmission paths into optical signals of other distinct wavelength bands.

(5) In the wavelength cross connect device of (2), wherein the second input-side WSS is configured to perform processing of splitting the wavelength multiplexed signal beam of each of the optical transmission lines into optical signals each of which is of any one of the wavelength bands and outputting the optical signals such that each of the split optical signals is output from one of output ports, and the wavelength band switch processing unit is replaced with a wavelength band converter configured to convert the one-wavelength-band optical signal output from the one of the output ports of the second input-side WSS into a different wavelength band.

With this configuration, as the wavelength band converters have a simpler and smaller configuration than the wavelength band switch processing units, the wavelength cross connect device can be accordingly reduced in size.

(6) In the wavelength cross connect device of (5), wherein the wavelength band converter is configured to shift a wavelength of the one-wavelength-band optical signal output from the one of the output ports of the second input-side WSS to a long-wavelength side or to a short-wavelength side to be converted into a wavelength in a different wavelength band.

With this configuration, wavelength band conversion can be performed on wavelength multiplexed signal beams for each wavelength in a wavelength band.

(7) In the wavelength cross connect device of any one of (2) to (6), wherein the wavelength band switching unit does not include the second output-side WSS, the WXC unit includes, instead of the first input-side WSS, a third input-side WSS that includes a plurality of input ports to which a wavelength multiplexed signal beam output from the second input-side WSS without conversion and the wavelength multiplexed signal beams output from the wavelength band switch processing units are input and a plurality of output ports mesh-connected to the input ports of the first output-side WSSes, and the third input-side WSS is configured to selectively output the wavelength multiplexed signal beam input from the second input-side WSS without conversion to the plurality of input ports and the wavelength multiplexed signal beams input from the wavelength band switch processing units to the plurality of input ports, to any one output port of the plurality of output ports.

With this configuration, optical signal transmission between the wavelength band switching unit and the WXC unit can be performed with the use of optical devices (second output-side WSS and second input-side WSS) capable of transmitting a plurality of wavelength multiplexed signal beams.

In addition to the above, the specific configurations can be modified as appropriate, without departing from the scope of the present invention.

REFERENCE SIGNS LIST 1, 1A, 1B Wavelength cross connect device
10 Wavelength band switching unit
11$a$ to 11$m$, 11$a$A to 11$m$A <1×Q> WSS (second input-side WSS)
12$a$ to 12$m$ <Q×1> WSS (second output-side WSS)
20 WXC unit 21$a$ to 21$m$ <1×N> WSS (first input-side WSS)
21$a$B to 21$m$B <Q×N> WSS (third input-side WSS)
22$a$ to 22$m$ <N×1> WSS (first output-side WSS)
31 Wavelength band demultiplexer
32, 33 Wavelength band converter (input-side converter)
34 <K×K> WSS (specific WSS)
35, 36 Wavelength band converter (output-side converter)
37 Wavelength band multiplexer
61 <1×P> WSS (first WSS)
62$a$ to 62$f$ Wavelength band converter
63 <P×1> WSS (second WSS)
1 to #j Wavelength band switch processing unit
1A to #jA Wavelength band converter

The invention claimed is:

1. A wavelength cross connect device comprising:
a wavelength band switching unit and a wavelength cross connect (WXC) unit,
wherein the wavelength band switching unit is configured to:
receive a first plurality of wavelength multiplexed signal beams each having been transmitted in multiple bands in a plurality of optical transmission lines respectively, the plurality of optical transmission lines each including one or a plurality of optical fibers, the first plurality of wavelength multiplexed signal beams each including multiplexed optical signals of distinct wavelength bands;
split each of the received first plurality of wavelength multiplexed signal beams into a predetermined number of wavelength multiplexed signal beams;
generate a plurality of wavelength-band-converted wavelength multiplexed signal beams generated for each of the received first plurality of wavelength multiplexed signal beams by performing wavelength band conversion on each of the predetermined number of wavelength multiplexed signal beams to convert the optical signals of the distinct wavelength bands multiplexed in the wavelength multiplexed signal beam into optical signals of different wavelength bands; and
output a second plurality of wavelength multiplexed signal beams each of which is selected from a predetermined one of the split first plurality of wavelength multiplexed signal beams and the plurality of wavelength-band-converted wavelength multiplexed signal beams generated from the predetermined number of wavelength multiplexed signal beams split from the predetermined one of the split first plurality of wavelength multiplexed signal beams,
wherein the WXC unit comprises:
a plurality of first input-side WSSes each configured to split a respective one of the second plurality of wavelength multiplexed signal beams into a third plurality of wavelength multiplexed signal beams; and
a plurality of first output-side WSSes mesh-connected to the plurality of first input-side WSSes, and
wherein the WXC unit is configured to input the third plurality of wavelength multiplexed signal beams split by each of the plurality of first input-side WSSes to the plurality of first output-side WSSes so as to reroute the second plurality of wavelength multiplexed signal beams to be output to output transmission lines.

2. The wavelength cross connect device according to claim 1, wherein the wavelength band switching unit comprises:
a plurality of second input-side WSSes provided respectively for the plurality of optical transmission lines and each configured to receive and split a respective one of the first plurality of wavelength multiplexed signal beams into the predetermined number of wavelength multiplexed signal beams;

for each of the plurality of second input-side WSSes, a plurality of wavelength band switch processing units each configured to generate, from a corresponding one of the predetermined number of wavelength multiplexed signal beams split by the second input-side WSS, a corresponding one of the plurality of wavelength-band-converted wavelength multiplexed signal beams in which wavelength bands of optical signals multiplexed in the corresponding one of the predetermined number of wavelength multiplexed signal beams have been converted to different wavelength bands; and a plurality of second output-side WSSes provided respectively for the plurality of second input-side WSSes and each configured to select a wavelength multiplexed signal beam from a fourth plurality of wavelength multiplexed signal beams comprising a corresponding one of the predetermined number of wavelength multiplexed signal beams split by the respective one of the plurality of second input-side WSSes and the plurality of wavelength-band-converted wavelength multiplexed signal beams generated by the plurality of wavelength band switch processing units provided for the respective one of the plurality of second input-side WSSes, and output the selected wavelength multiplexed signal beam to a respective one of the plurality of first input-side WSSes of the WXC unit.

3. The wavelength cross connect device according to claim 2, wherein each of the plurality of wavelength band switch processing units comprises:

a wavelength band demultiplexer;

input-side converters;

a specific WSS;

output-side converters; and a wavelength band multiplexer, wherein the wavelength band demultiplexer is configured to demultiplex optical signals of distinct wavelength bands multiplexed in the wavelength multiplexed signal beam output from a corresponding one of the plurality of second input-side WSSes, to generate demultiplexed optical signals of the distinct wavelength bands, wherein the input-side converters are each configured to convert, of the demultiplexed optical signals of the distinct wavelength bands, a respective optical signal of a wavelength band other than a predetermined specific wavelength band into an optical signal of the specific wavelength band, wherein the specific WSS has a same number of input ports and a same number of output ports as a number of the demultiplexed optical signals of the distinct wavelength bands and is configured to:

receive, through the input ports, the optical signals of the specific wavelength band having been converted by the input-side converters and an optical signal of the specific wavelength band among the demultiplexed optical signals of the distinct wavelength bands, and switch and output, from the output ports, the received optical signals of the specific wavelength bands so that a wavelength band of each of the demultiplexed optical signals of the distinct wavelength bands is converted to a predetermined wavelength band as a result of processing by the input-side converters, the specific WSS, and the output-side converters, wherein the output-side converters are each configured to convert the optical signal of the specific wavelength band output from a corresponding one of the output ports into an optical signal of a predetermined wavelength band, and wherein the wavelength band multiplexer is configured to: combine the optical signals converted by the output-side converters and an optical signal output from a corresponding one of the output ports of the specific WSS to generate the corresponding one of the plurality of wavelength-band-converted wavelength multiplexed signal beams; and output the generated wavelength-band-converted wavelength multiplexed signal beam to a corresponding one of the plurality of second output-side WSSes.

4. The wavelength cross connect device according to claim 2, wherein each of the plurality of wavelength band switch processing units comprises:

a first WSS configured to demultiplex optical signals of distinct wavelength bands multiplexed in the wavelength multiplexed signal beam output from a corresponding one of the plurality of second input-side WSSes into a predetermined number of optical signals each including the optical signal of any one of the distinct wavelength bands solely such that the demultiplexed predetermined number of optical signals includes a predetermined number of optical signals of a same wavelength band;

a plurality of wavelength band converters, a number of which being the same as a number of the demultiplexed predetermined number of optical signals, each configured to convert a corresponding one of the optical signals of the distinct wavelength bands demultiplexed by the first WSS into an optical signal of a different wavelength band; and a second WSS configured to perform wavelength band multiplex processing to generate the corresponding one of the plurality of wavelength-band-converted wavelength multiplexed signal beams from the optical signals of the distinct wavelength bands converted by the plurality of wavelength band converters, and output the generated wavelength-band-converted wavelength multiplexed signal beam to a corresponding one of the plurality of second output-side WSSes.

5. The wavelength cross connect device according to claim 2, wherein the plurality of second input-side WSSes are each configured to split the respective one of the first plurality of wavelength multiplexed signal beams into a predetermined number of one-wavelength-band optical signals each including the optical signal of any one of the distinct wavelength bands solely and output the predetermined number of one-wavelength-band optical signals each from a corresponding one of output ports of the second input-side WSS, and wherein the plurality of wavelength band switch processing units are replaced with a plurality of wavelength band converters each configured to convert the wavelength band of a corresponding one of the predetermined number of one-wavelength-band optical signals output from a corresponding one of the plurality of second input-side WSSes into a different wavelength band.

6. The wavelength cross connect device according to claim 5, wherein each of the plurality of wavelength band converters is configured to shift a wavelength of the one-wavelength-band optical signal output from the corresponding one of the output ports of the corresponding second input-side WSS to a long-wavelength side or to a short-wavelength side to be converted into a wavelength in a different wavelength band.

7. The wavelength cross connect device according to claim 2, wherein the wavelength band switching unit does not include the plurality of second output-side WSSes, the WXC unit includes, instead of the plurality of first input-side WSSes, a plurality of third input-side WSSes each including: a plurality of input ports to which the fourth plurality of wavelength multiplexed signal beams are respectively input; and a plurality of output ports mesh-connected to the input ports of the plurality of first output-side WSSes, and each of the plurality of third input-side WSSes is configured to selectively output one of the fourth plurality of wavelength multiplexed signal beams input to the plurality of input ports to any one of the plurality of output ports.

8. A wavelength cross connect method to be performed by a wavelength cross connect device, the wavelength cross connect method comprising steps of:

receiving a first plurality of wavelength multiplexed signal beams each having been transmitted in multiple bands in a plurality of optical transmission lines respectively, the plurality of optical transmission lines each including one or a plurality of optical fibers, the first plurality of wavelength multiplexed signal beams each including multiplexed optical signals of distinct wavelength bands;

performing wavelength band conversion on each of the received first plurality of wavelength multiplexed signal beams to generate a plurality of wavelength-band-converted wavelength multiplexed signal beams in each of which the wavelength bands of the optical signals of the distinct wavelength bands multiplexed in the wavelength multiplexed signal beam have been converted, generating a second plurality of wavelength multiplexed signal beams each of which is selected from a predetermined one of the split first plurality of wavelength multiplexed signal beams and the plurality of wavelength-band-converted wavelength multiplexed signal beams generated from the predetermined one of the split first plurality of wavelength multiplexed signal beams, splitting each of the second plurality of wavelength multiplexed signal beams into a third plurality of wavelength multiplexed signal beams; and outputting the third plurality of wavelength multiplexed signal beams so as to reroute the second plurality of wavelength multiplexed signal beams to be output to output transmission lines.

* * * * *